Figure 1:
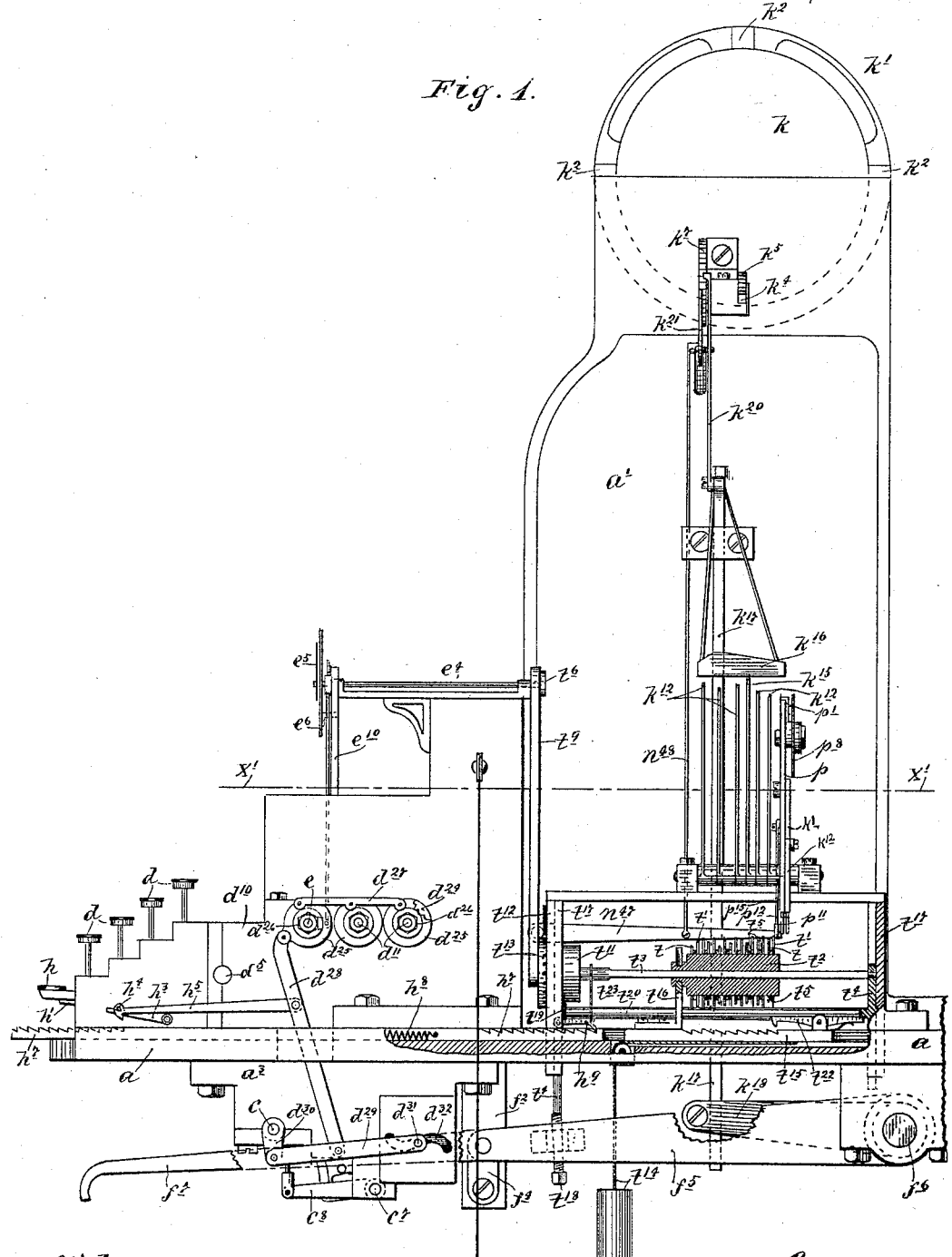

(No Model.)　　　　　　　　　　　　　　　　　　　　　10 Sheets—Sheet 1.
F. A. JOHNSON.
MATRIX MAKING MACHINE.

No. 584,364.　　　　　　　　　　　Patented June 15, 1897.

Witnesses.
A. H. Opsahl.
Frank D. Merchant.

Inventor.
Frank Amos Johnson
By his Attorney.
Jas. P. Williamson (No Model.) 10 Sheets—Sheet 2.
F. A. JOHNSON.
MATRIX MAKING MACHINE.

No. 584,364. Patented June 15, 1897.

Witnesses.
A. H. Opsahl.
Frank D. Merchant.

Inventor.
Frank Amos Johnson
By his Attorney
Jas. F. Williamson (No Model.)   
F. A. JOHNSON.  
MATRIX MAKING MACHINE.  
No. 584,364.   Patented June 15, 1897.

10 Sheets—Sheet 3.

Witnesses.
A. H. Opsahl.
Frank D. Merchant.

Inventor.
Frank Amos Johnson
By his Attorney.
Jas. F. Williamson.

(No Model.) 10 Sheets—Sheet 4.
F. A. JOHNSON.
MATRIX MAKING MACHINE.
No. 584,364. Patented June 15, 1897.

Witnesses.
A. H. Opsahl.
Frank D. Merchant.

Inventor
Frank Amos Johnson
By his Attorney.
Jas. F. Williamson (No Model.) 10 Sheets—Sheet 5.

F. A. JOHNSON.
MATRIX MAKING MACHINE.

No. 584,364. Patented June 15, 1897.

Witnesses.
A. H. Opsahl.
Frank D. Merchant.

Inventor.
Frank Amos Johnson
By his Attorney.
Jas. F. Williamson

THE NORRIS PETERS CO., PHOTO-LITHO., WASHINGTON, D. C.

(No Model.)  10 Sheets—Sheet 6.

F. A. JOHNSON.
MATRIX MAKING MACHINE.

No. 584,364.  Patented June 15, 1897.

Witnesses
A. H. Opsahl.
Frank D. Merchant,

Inventor
Frank Amos Johnson
By his Attorney.
Jas. F. Williamson (No Model.)
F. A. JOHNSON.
MATRIX MAKING MACHINE.
No. 584,364. Patented June 15, 1897.
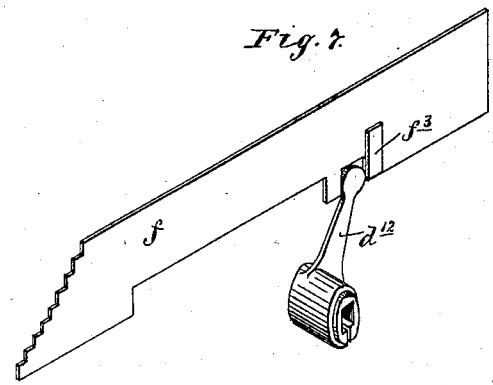
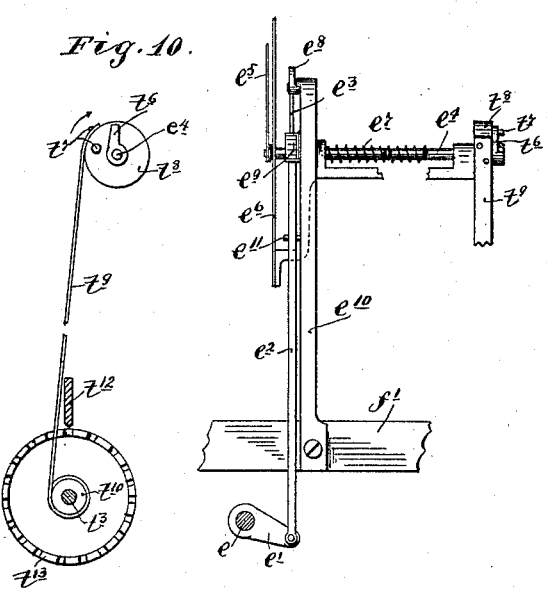
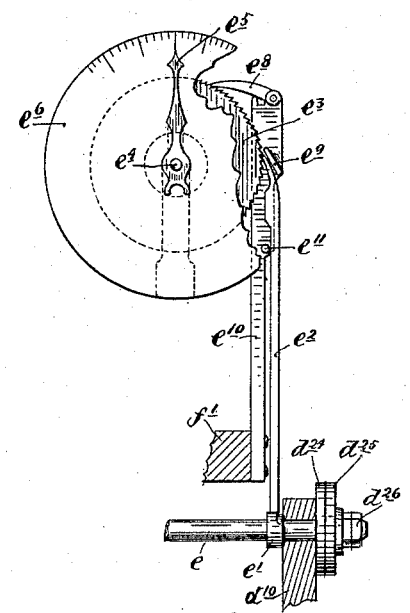
Witnesses.
A. H. Opsahl.
Frank D. Merchant.
Inventor.
Frank Amos Johnson
By his Attorney.
Jas. F. Williamson

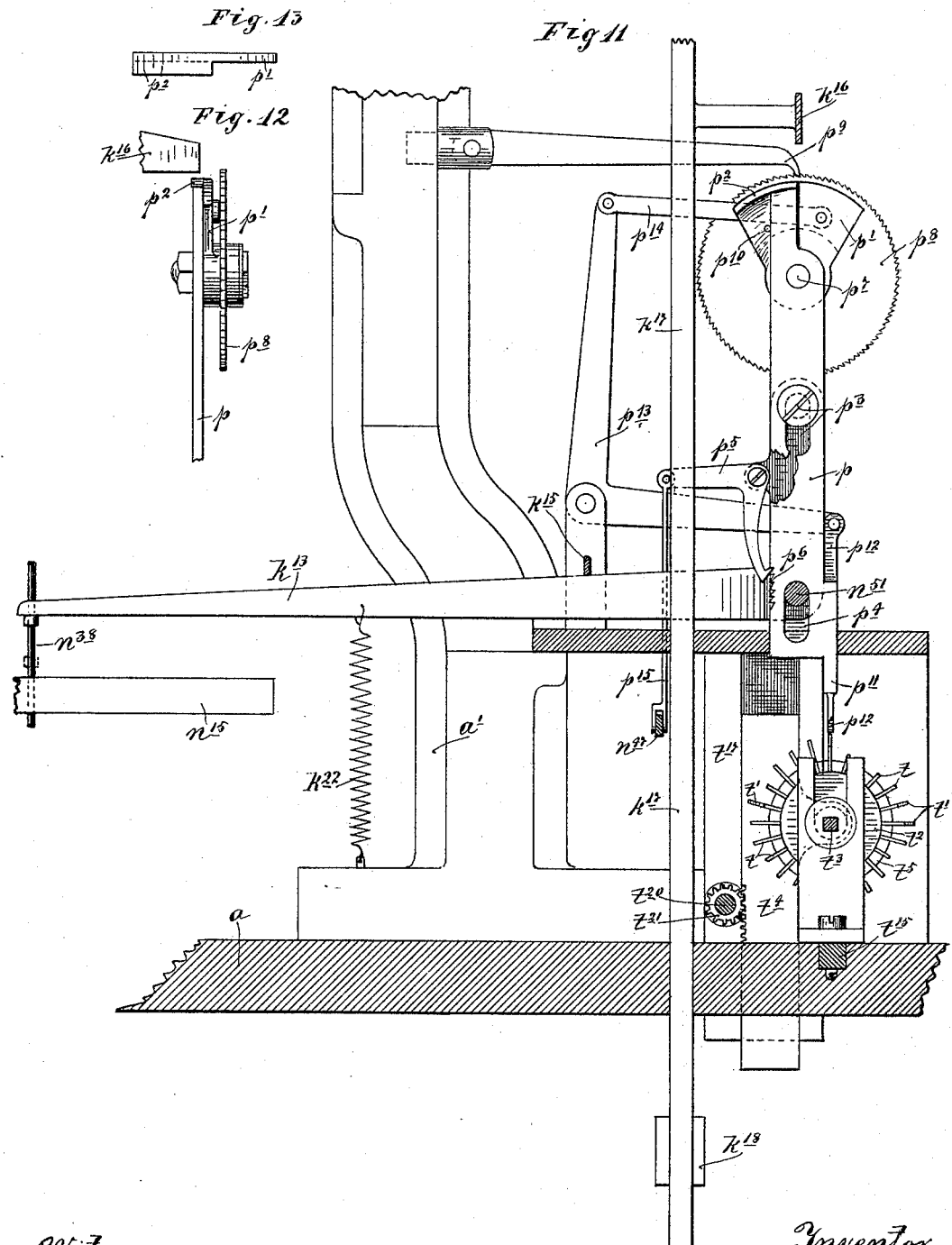

(No Model.)  
10 Sheets—Sheet 9.

F. A. JOHNSON.
MATRIX MAKING MACHINE.

No. 584,364. Patented June 15, 1897.

Witnesses.
A. H. Opsahl.
Frank D. Morchart,

Inventor
Frank Amos Johnson
By his Attorney.
Jas. F. Williamson (No Model.)

F. A. JOHNSON.
MATRIX MAKING MACHINE.

No. 584,364.   Patented June 15, 1897.

10 Sheets—Sheet 10.

Witnesses
A. H. Opsahl.
Frank D. Merchant,

Inventor.
Frank Amos Johnson
By his Attorney.
Jas. F. Williamson

THE NORRIS PETERS CO., PHOTO-LITHO., WASHINGTON, D. C.

UNITED STATES PATENT OFFICE.

FRANK AMOS JOHNSON, OF MINNEAPOLIS, MINNESOTA, ASSIGNOR TO THE TACHYTYPE MANUFACTURING COMPANY, OF SAME PLACE.

MATRIX-MAKING MACHINE.

SPECIFICATION forming part of Letters Patent No. 584,364, dated June 15, 1897.

Application filed August 11, 1892. Renewed May 17, 1897. Serial No. 637,002. (No model.)

*To all whom it may concern:*

Be it known that I, FRANK AMOS JOHNSON, a citizen of the United States, residing at Minneapolis, in the county of Hennepin and State of Minnesota, have invented certain new and useful Improvements in Matrix-Making Machines; and I do hereby declare the following to be a full, clear, and exact description of the invention, such as will enable others skilled in the art to which it appertains to make and use the same.

My invention relates to matrix-making or composing machines.

The invention is in the same line as my former United States patent, numbered 463,388, issued to me of date November 17, 1891, entitled "Matrix-making and stereotyping machine," and in the same line as my pending application, filed April 25, 1892, under Serial No. 430,583, entitled "Linotyping-machines." The matrix-making machine herein shown and described was designed for use as part of the linotype-machine of the class shown and described in my said pending application. Inasmuch, however, as the improvements relate solely to the matrix-making mechanism, it is not deemed necessary for the purposes of this case to illustrate and describe the casting mechanism which is used in conjunction with this machine to produce a linotype.

In its general design the present machine is very similar to the matrix-making mechanism shown and described in my pending application. Like in the said former machine a duplicate dummy is set from the keyboard, whose settings are transferred to a dummy proper, which dummy proper then controls the matrix-making mechanism for the first line, while the duplicate dummy is being set for the next line. As in the said former machine, the type are cut on the well-known unit system of self-spacing type, and the feed movements of the matrix-material-feed mechanism is correspondingly arranged for a variable feed divided into corresponding units.

The most radical features of improvement in the general machine relates to the justifying mechanism, which in the present machine is constructed to operate on a different principle from that shown in my said pending application and prior patent, and which involves two broadly new pieces of mechanism, one of which, for distinction, will hereinafter be called the "spacing-controller" or "justifier proper" and the other of which is used to set the said spacing-controller or justifier proper and will be called, for distinction, the "justifier-key."

The broad claims upon the spacing-controller and the justifier-key have been transferred to my Patent No. 536,149, dated March 19, 1895.

In my former machine the normal key for word-spacing was increased or decreased for different lines, if necessary, by a supplemental feed device working on the principle of proportional division or distribution, so as to make the word-spacing absolutely equal among all the words in the given line.

In my present machine the distribution or division of the word-spacing is by way of quotient and remainder. In other words, if the total amount of space, measured in units, which must be distributed between the words of any given line is an exact multiple of the number of word-spaces in that line then the spacing between all the said words for that line will be equal or uniform; but if the said total amount to be distributed, measured in units, is not an exact multiple of the word-spaces then the said total amount will be distributed as nearly equal as possible without dividing or splitting a unit, or, in other words, the integral quotient of the said total amount of space divided by the number of word-spaces in that line will be distributed or divided among all the word-spaces and the integral remainder will be distributed one unit more to each word-space among as many of the word-spaces as necessary, beginning at the first word-space of the given line. This distribution is always possible on this machine in virtue of the unit principle of construction and in virtue of the further fact that there must always be at least one unit of space between each pair of words in the line. From the last-named fact it is obvious that there will always be a total of word-spacing in any given line which, when divided by the number of word-spaces, will give an integral quotient with or without an integral remainder. Remembering these facts, the principle of distribution may be readily understood, and the mechanism for effecting the same becomes susceptible of a simple description.

To illustrate the principle, suppose the predetermined line for which the machine is constructed contains one hundred and thirty units and suppose that the letter-space required for the letters and character indicated on the keyboard for any given line would occupy one hundred and twenty units. There would then be ten units left for distribution among the words or as word-spaces. Suppose the given line contained eleven words or ten spaces. Then one unit of spacing would be put in each word-space in the line, or, in other words, the said ten units would be distributed among all the word-spaces, one unit in a place. Suppose the same line contained only six words or five word-spaces. Then the said ten units would be distributed two units to each space. Suppose, again, the same line contained only five words or four spaces. Then the said total of ten units would be distributed, according to the quotient and remainder, of ten divided by four, or two units each for all the word-spaces and one unit more for each of the first two word-spaces, or, otherwise stated, the word-spacing would be in units 3, 3, 2, 2. From the foregoing it will be seen that the total word-spacing for any given line is taken as subject to distribution or division according to quotient and remainder, and, as will appear from subsequent description, that the mechanism for the purpose is of such a character that it will give this result without any regard to the question whether the spacing in any given line be the standard or "normal" spacing of two units or more in less than the same. By looking at the subject in this way all difficulty and confusion of statement on account of reference to so-called "normal" spacing and "variation" therefrom by way of addition or subtraction may be avoided.

Turning now to the mechanism, the spacing-controller or justifier proper, heretofore noted, comprises a pair of parts having a common adjustment or capable of a common setting to determine or fix the word-spacing, according to quotient, and one of which parts is adjustable with respect to the other to determine or fix the additional spacing for the integral remainder or odd units, if any there be. This justifier proper is applicable to any machine where word-spacing is required, whether that spacing be effected by the feed of a matrix or other impression material or by the insertion of positive spacing-quads, such as in a type-setting or type-casting machine, or for the spacing of matrices from which justified linotypes may be cast. In the present machine the said justifier proper or spacing-controller is applied to a variable matrix-material-feed mechanism, as will hereinafter appear.

I prefer in this machine to set the justifier proper for each line by an automatically-operated device, which I have termed a "justifier-key." This justifier-key is a unique feature in this class of machines. It consists, essentially, of a series of parts or surfaces predetermined in height or length or size for every possible word-spacing that might ever be required for the justification of any possible line of the pretermined length for which the machine is constructed. The analogy is that of a key to a lock, the parts corresponding to keys to particular locks; but, continuing the figure of speech, as there are large numbers of locks or, in other words, a large number of different settings of the justifier proper to be considered and provided for, the analogy is that of a bunch of keys, and the distinctive term "justifier-key" will be used in the collective sense to cover and include all the different sets of parts or particular keys of which the said justifier-key is composed. The said parts might be made and kept for use by hand exactly like a bunch of keys; but for convenience and automatic action they are mounted on a common support in a bifactored arrangement. This permits the said support to be movable in two corresponding different directions in order to position the proper set of parts of the justifier-key for action on and the setting of the justifier proper, as may be required in any given case to justify the line. In the machine, as shown, the parts of this justifier-key work in sets of two pins each, one of which serves to set the justifier proper for spacing according to integral quotient and the other for setting the same for the additional spacing required for the integral remainder, if any. These sets of pins of the justifier-key are sufficient in number to set the said justifier proper for every possible word-spacing that might ever be required and enough duplicates to permit the alinement or location of any proper set of pins by the said factored movement of the justifier-key in the said two different directions. To render this point still more distinct, it may be stated as a fact that comparatively few sizes or lengths of sets of pins is sufficient for every possible setting of the justifier proper required; but one hundred and ninety-two sets, many of which are duplicates, are mounted on said supports to permit the alinement of any proper set in the given case by said two movements of said support in different directions. These two movements of the justifier-key are imparted from the keyboard by independent connections, one of which rotates or moves the justifier-key according to the letter-space required for the selected line and the other of which connections slides or moves the said support longitudinally according to the number of word-spaces in the selected line.

It is possible to use a justifier proper and a justifier-key such as hereinbefore described in a machine of this kind in virtue of the preliminary representation of the selected line had on the dummies, hereinbefore referred to and fully described in my previous patent and pending application heretofore identified.

The exact construction of the justifying mechanism above described in general terms will appear in the detailed description hereinafter contained and will be defined in the claims.

The other points of novelty go mostly to details of construction, either in the primary setting devices or in the matrix-making mechanism, with a view of rendering the machine more efficient, and will appear in the detailed description and be defined in the claims.

Figure 2:
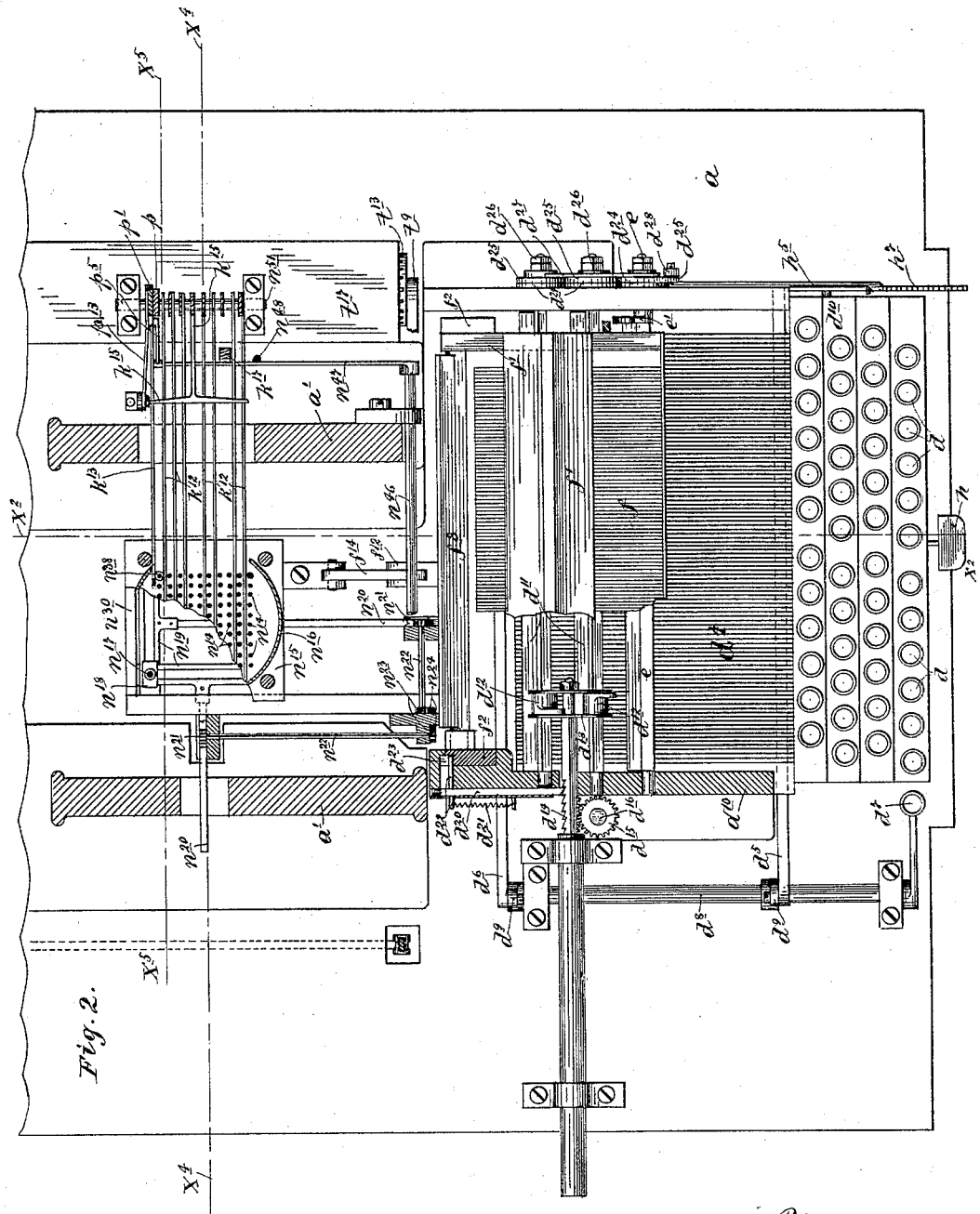
Figure 3:
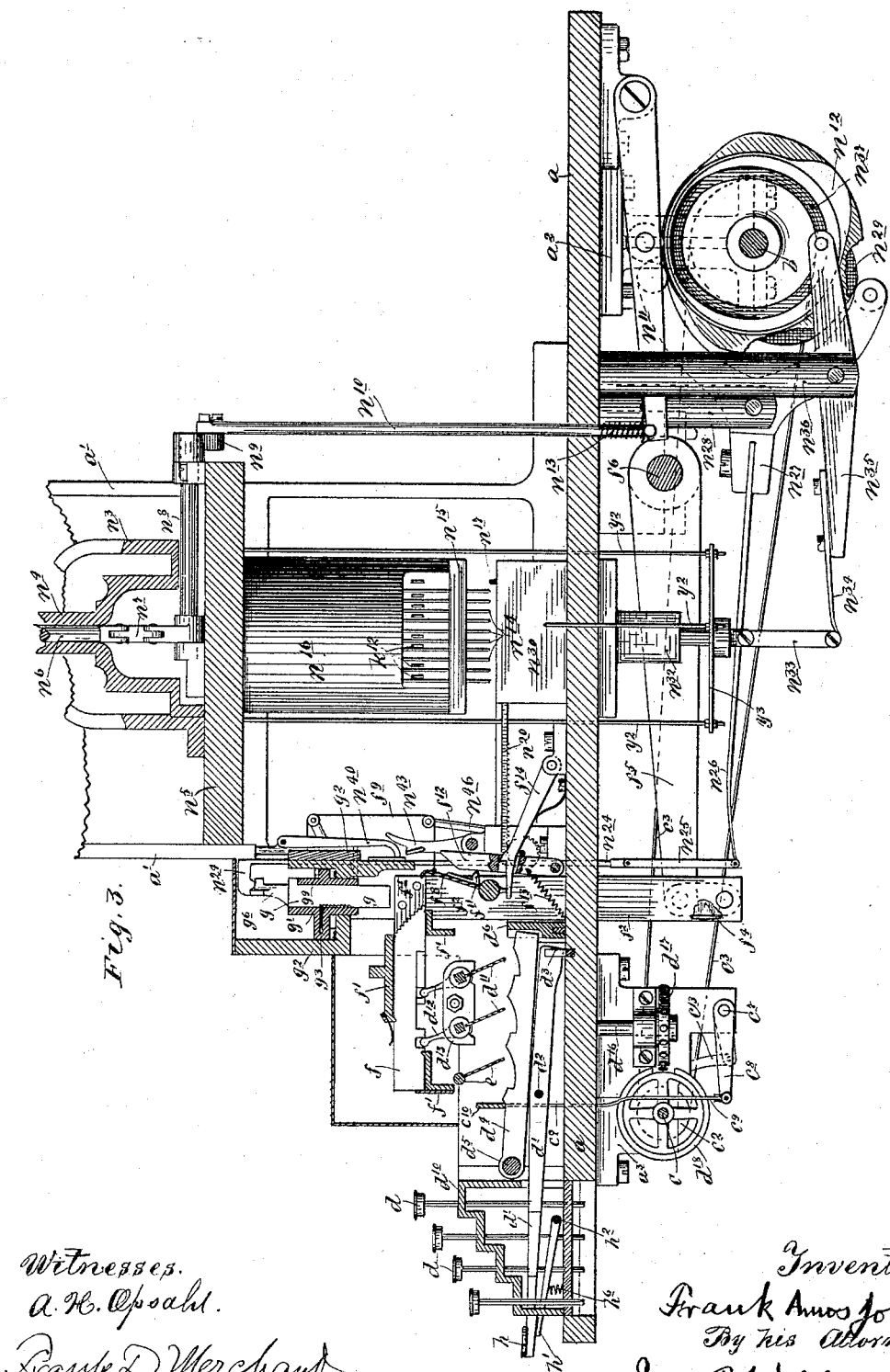
Figure 4:
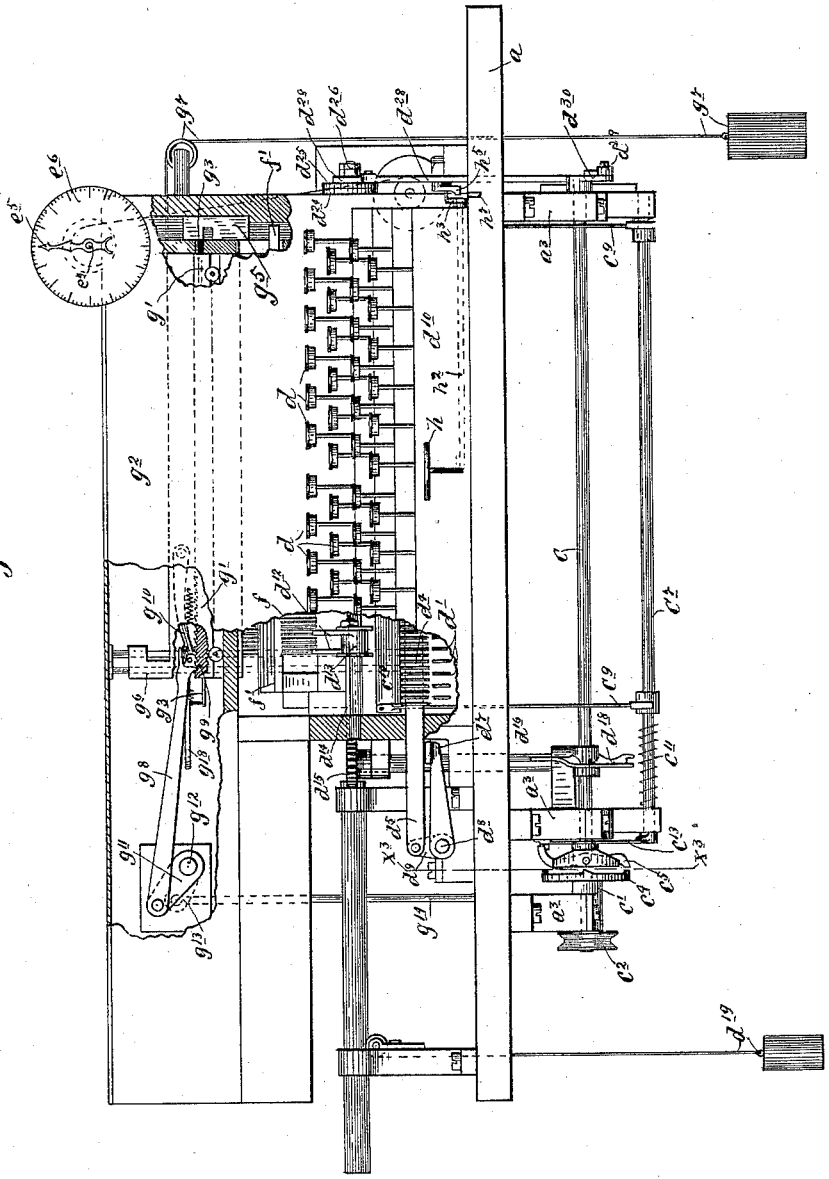
Figure 5:
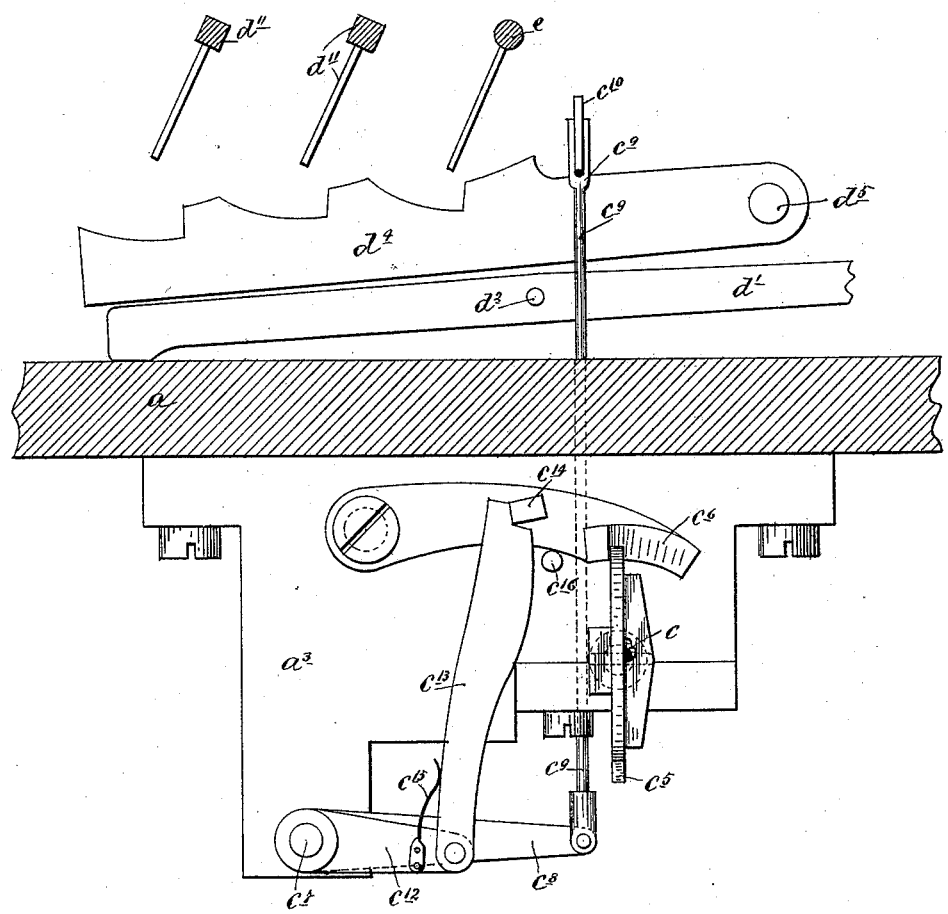
Figure 6:
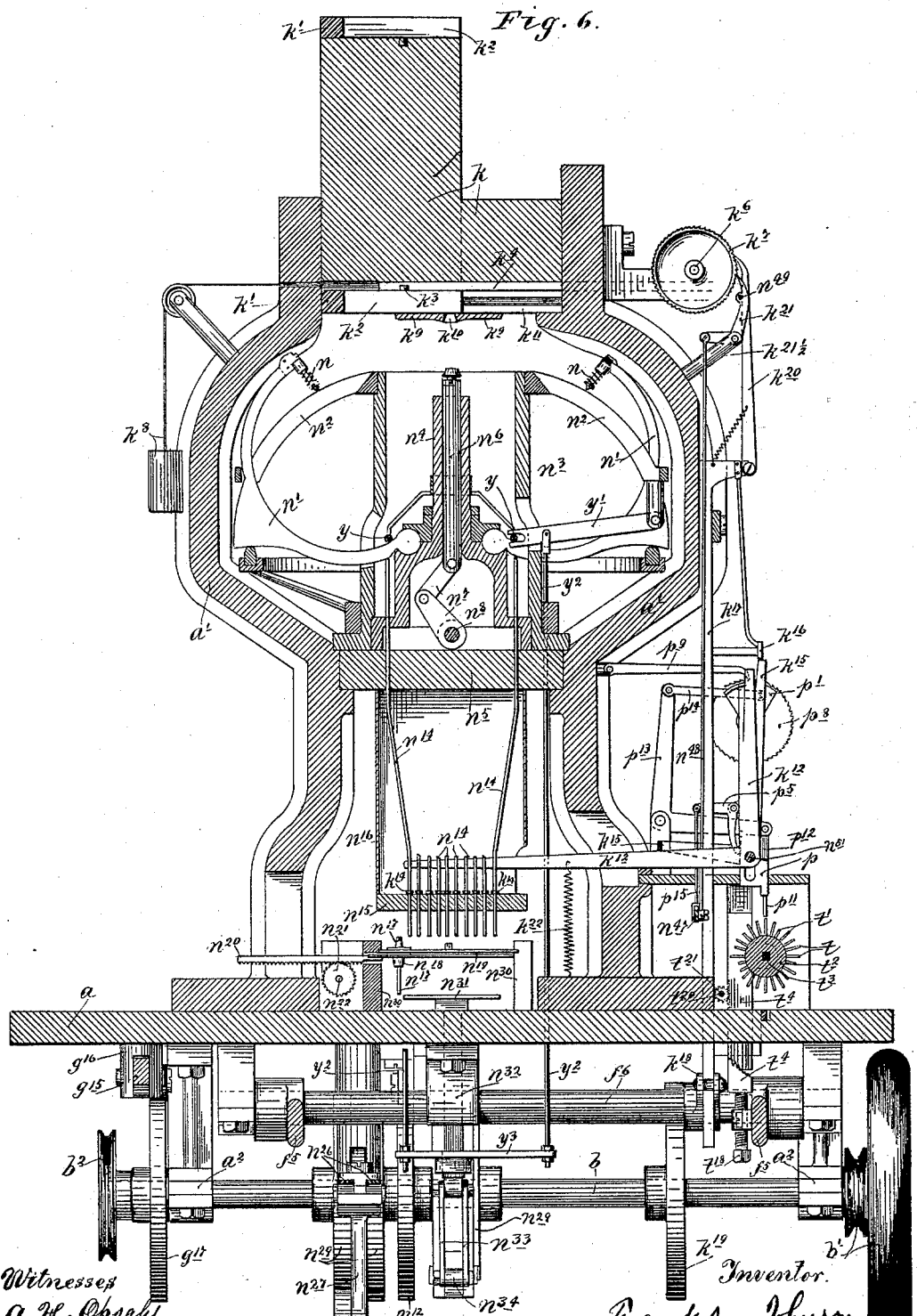
Figure 15:
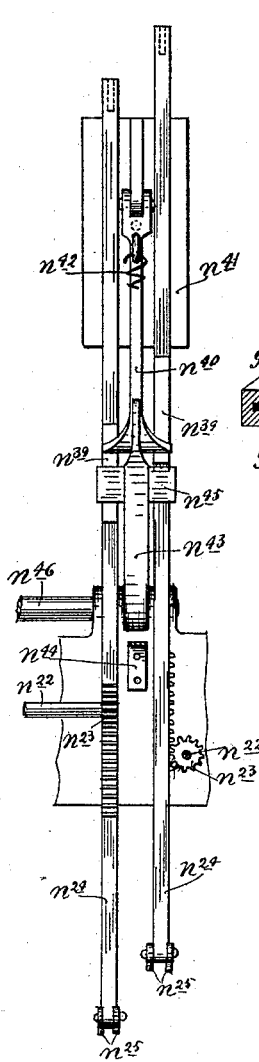
Figure 14:
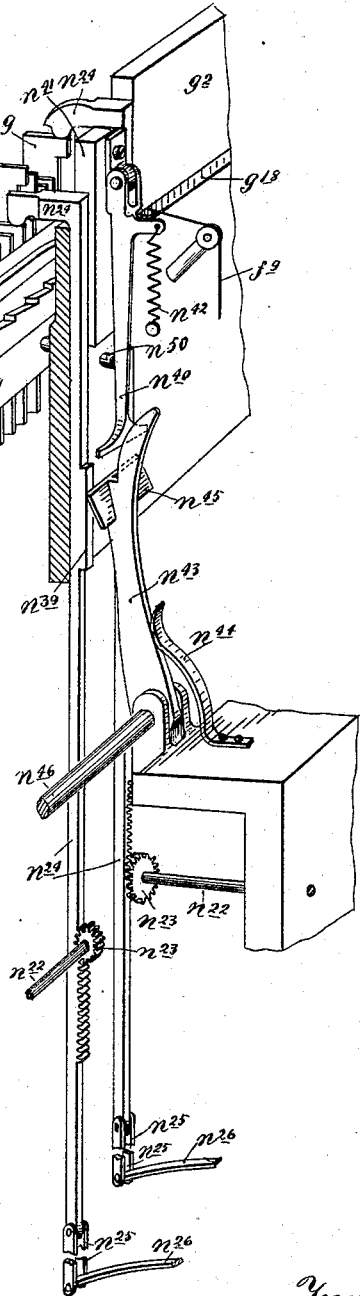
Figure 16:
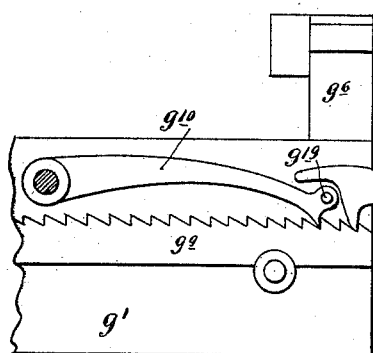
Figure 17:
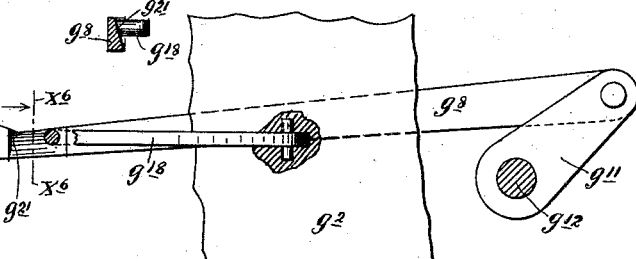
Figure 18:
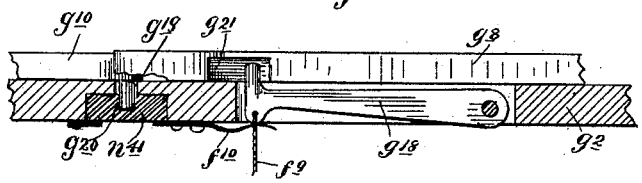
Figure 19:
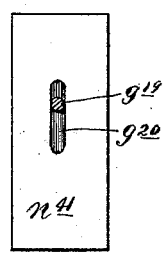

*Detailed description.*—In the accompanying drawings, Figure 1 is a right-side elevation of the machine, some parts being removed, others broken away, and some parts being shown in section. Fig. 2 is a horizontal section approximately on the line $x'\ x'$ of Fig. 1. Fig. 3 is a vertical section from front to rear, taken approximately on the line $x^2\ x^2$ of Fig. 2. Fig. 4 is a front elevation of a part of the machine, showing the keyboard and primary setting devices in working position, the other parts located at the rear of the same being removed. Fig. 5 is a vertical section on the line $x^3\ x^3$ of Fig. 4, looking from the left, some parts being removed and other parts shown in diagram only. Fig. 6 is a vertical section from right to left through the entire machine, approximately on the line $x^4\ x^4$ of Fig. 2, looking from the front. Fig. 7 is a detail in perspective illustrating the relation of one of the crank-arms of the setting-carriage to one of the slides of the duplicate dummy. Fig. 8 is a front elevation, with some parts broken away, showing the letter-space indicator. Fig. 9 is a right-side elevation of the parts shown in Fig. 8. Fig. 10 is a detail in rear elevation showing the means of transmitting motion from the indicator to the justifier-dummy. Fig. 11 is a vertical section on the line $x^5\ x^5$ of Fig. 2, looking toward the rear, some parts being broken away and others shown in diagram, the parts being on a larger scale than the corresponding parts shown in Fig. 6. Fig. 12 is a detail in right-side elevation of a part of the variable word-space feed mechanism or justifier proper shown in Fig. 11. Fig. 13 is a plan view of a part of Fig. 11. Fig. 14 is a view in perspective illustrating the relation and action of the dummy-line proper and the placing-plungers or devices for locating the selecting-finger and the trip for throwing the dummy out of action. Fig. 15 is a rear elevation of some parts shown in Fig. 14. Fig. 16 is a skeleton view in elevation showing a part of the dummy-line-feed mechanism, looking from the rear. Fig. 17 is a detail in section on the line $x^6\ x^6$ of Fig. 16. Fig. 18 is a detail in plan of the parts shown in Fig. 16. Fig. 19 is a detail in front view of a part of Fig. 14.

*Classification of reference-letters.*—For convenience the following classification of reference-letters will be observed. $a$ and its powers $a'\ a^2$, &c., denote the framework. $b$ and its powers denote the power-shaft, &c.; $c$ and its powers the setting-shaft and its trip mechanism; $d$ and its powers the keyboard, setting-carriage, &c.; $e$ and its powers the indicator mechanism; $f$ and its powers the duplicate dummy; $g$ and its powers the dummy proper; $h$ and its powers the word-space key and the word-space rack, &c.; $k$ and its powers the impression-anvil, matrix-holder, and the normal matrix-feed devices; $n$ and its powers the dies and their selecting and alining mechanism; $p$ and its powers the variable word-space feed constituting the justifier proper; $t$ and its powers the justifier-controller, and $y$ and its powers unclassified devices, including the return-ring, &c., belonging properly to the letter $n$. $z$ denotes the matrix material.

As far as practicable the parts will be described in the order of their operation.

*Main frame.*—The main frame comprises a horizontal table or bed-plate $a$, suitable supporting-legs, (not shown,) a two-part central support $a'$ fixed to and projecting upward from the bed-plate, and various other projecting fixed parts, which will be noted, so far as is necessary, in connection with the description of the operative parts.

Bearings for shafts and similar minor parts which are necessarily implied and well understood will not be specifically noted by reference-letters, except when desirable to locate some operative parts.

*The power-shaft.*—The power-shaft $b$ is arranged from right to left under the rear part of the bed-plate in bearing-brackets $a^2$ depending therefrom. The power-shaft carries at its right end a combined driving-pulley and fly-wheel $b'$ and at its left end a driving-pulley $b^2$ for transmitting motion to the setting-shaft. The power-shaft carries a number of cams, which will be noted in connection with the parts driven thereby. This power-shaft is kept in constant motion at a high rate of speed.

The Primary Setting Devices.

*The setting-shaft and its trip mechanism.*—A divided setting-shaft $c\ c'$ is journaled in bearing-brackets $a^3$, depending from the front part of the bed-plate, under the keyboard. Of this shaft the left section $c'$ carries a relatively small pulley $c^2$, which is connected by the belt $c^3$ with a relatively large pulley $b^2$ on the constantly-running shaft $b$. Hence the section $c'$ of the setting-shaft will be kept in constant motion at a very high rate of speed. The section $c'$ of the setting-shaft carries at its right end a ratchet-faced clutch-disk $c^4$, and the section $c$ of the setting-shaft carries at its left end a pivoted spring-pressed pawl $c^5$, which constantly tends, under the tension of its spring, to engage with the clutch $c^4$. The pawl $c^5$ is prevented from this engaging movement by a pivoted cam-faced stop-arm $c^6$, the cam-surface of which normally engages with the tail end of the pawl and holds it out of engagement with the clutch.

$c^7$ is an idle-shaft, also journaled in the bearing $a^3$, provided with a pair of arms $c^8$, connected by rods $c^9$ with a common trip-bail $c^{10}$ in position to be tripped by the operation of any key on the keyboard, including the spacing-key as well as the character-keys. The bail $c^{10}$ is under tension to assume its lowermost position by a spring $c^{11}$, applied to the bail-shaft $c^7$. The bail-shaft $c^7$ carries at its left end an arm $c^{12}$, having pivoted thereto a trip-latch $c^{13}$, the upper end of which is notched and is adapted to engage under a stop-lug $c^{14}$ on the face of the stop-arm $c^6$. The trip-latch $c^{13}$ is held in its normal position by a spring $c^{15}$. The downward movement of the stop-arm $c^6$ is limited by a stop-pin $c^{16}$. With this construction whenever a key is struck the trip-bail is raised, carrying up the stop-arm $c^6$ and allowing the pawl $c^5$ to engage with the clutch $c^4$, thereby causing the two sections of the shaft to move together for one complete turn of the shaft. Immediately after passing off the stop-arm $c^6$ the tail of the pawl $c^5$ will strike the front edge of the pivoted latch $c^{13}$ and throw the same backward away from the stop-lug $c^{14}$, allowing the stop-arm $c^6$ to drop back into its normal position onto the stop-pin $c^{16}$, thereby insuring the return of the stop-arm $c^6$ into position to engage the tail of the pawl $c^5$, so as to throw the same out of engagement with the clutch $c^4$ at the completion of its revolution, regardless of whether the key has been released from the finger or not. At the completion of the turn of the shaft or before the same the latch $c^{13}$ will have been returned into its normal position by the spring $c^{15}$. In this way the section $c$ of the setting-shaft is tripped into action, given a complete turn, and again thrown out of action every time that a key is struck.

*The keys, &c.*—The keyboard and its immediately-connected parts are located at the front of the bed-plate. The keys $d$ $d'$, of which parts $d$ are the finger-pieces and $d'$ the key-levers, are pivoted to the fulcrum-rod $d^2$ and work with their rear ends between the teeth of a fixed guide-comb $d^3$. The key-levers are held in their normal position under tension by the tension on the trip-bail $c^{10}$. Directly over the keys are located a series of differentially-notched pieces $d^4$, for distinction called "blade-stops," pivoted at their forward ends to a pivot-rod $d^5$ and having their rear or free ends working in vertical grooves of a guide-plate $d^6$. These blade-stops are in number equal to all the characters, upper and lower case letters, numbers, normal spaces, punctuation-marks, &c., that it is desired to use on the machine. The key-levers are in number one-half the number of the blade-stops, and the blade-stops are shifted to change from lower to upper case letters. This shift is effected from a shift or cap key $d^7$ on a rock-shaft $d^8$, located at the left of the keyboard, having crank-arms $d^9$, one of which is connected to the fulcrum-rod $d^5$ and the other to the guide-plate $d^6$.

The blade-stops $d^4$ all underlie the trip-bail $c^{10}$.

The key-levers and blade-stops are inclosed by a box $d^{10}$, which affords the bearings for the different parts, the front plate of the box being stepped and perforated to permit the outward passage of the finger-pieces of the keys. Journaled in this box directly above the blade-stops are a pair of setting-blades $d^{11}$, mounted with freedom for a rocking motion and having mounted on their shafts a setting-carriage consisting of a pair of crank-arms $d^{12}$, held between a pair of end plates $d^{13}$, secured to the feed-rack $d^{14}$. The backs or shafts of the setting-blades are square in cross-section, and the passages in the crank-arms are of corresponding shape, so that the carriage is free to slide on the said shafts and the crank-arms will be rocked with the blades, but in the reverse direction. The feed-rack $d^{14}$ engages with a pinion $d^{15}$ on the upper end of a vertical shaft $d^{16}$, having on its lower end a pin-wheel $d^{17}$, in engagement with a screw-acting cam-wheel $d^{18}$, located on the section $c$ of the setting-shaft. The cam-wheel $d^{18}$ is provided with a gap, in which the pin-wheel stands in the normal position of the shaft. The setting-carriage is under strain to move toward the left by a cord and weight $d^{19}$ and is held in whatever position it may be set under its feed movements by a retaining-pawl $d^{20}$, engaging with the ratchet-teeth cut on the back of the rack. The retaining-pawl is under tension from a spring $d^{21}$ and is provided with an inwardly-projecting pin $d^{22}$, working through a slot in the box and into the path of a cam-surface $d^{23}$ on the left part of a vertically-movable frame which supports the parts of the duplicate dummy, soon to be described. This relation of the pin $d^{22}$ and the cam-surface $d^{23}$ serves to release the setting-carriage at the proper time, permitting the same to be returned by its cord and weight, as will more fully hereinafter appear.

$e$ is a rock-shaft located parallel with the pair of rock-blades $d^{11}$ and limited in the same way by the blade-stops $d^4$, and which is used to operate a letter-space indicator for indicating and registering the letter-space required for the selected characters, the particular blade-stop $d^4$ which intercepts the indicator rock-shaft $e$ when the space-bar $h$ is struck being so constructed that the said shaft $e$ will not be rocked so as to affect the indicator at all. The connections from this indicator-blade $e$ to the indicator will appear later on. All three of the rock-blades are provided on their right-hand ends with a pair of disks $d^{24}$ and $d^{25}$, of which $d^{24}$ is rigid on the blade-shaft and $d^{25}$ is held in frictional contact therewith by jam-nuts $d^{26}$. These two parts $d^{24}$ and $d^{25}$ form a friction-clutch. The loose members $d^{25}$ of these friction-clutches are connected by a link $d^{27}$, and one of the members, the front member as shown, is connected by another link $d^{28}$ to a crank-rod $d^{29}$, pivoted at one end to a crank-arm $d^{30}$ on the right-hand end of the setting-shaft and having at its other end a pin $d^{31}$, which works in a cam-groove $d^{32}$ in the form of a reverse curve cut in the right-hand bearing-bracket $a^3$. The peculiar motion imparted by these connections will be traced later on. Suffice it for the present purposes to note that the friction-clutch connections to the blades permit the same to be variably intercepted and stopped at any point in their rocking motion by the before-noted blade-stops $d^4$.

*The duplicate dummy.*—$f$ are the slides, and $f'$ the horizontal parts and $f^2$ the vertical parts of the vertically-movable frame on which the said slides are mounted, constituting together the duplicate dummy, as named in my pending application. The slides or parts $f$ work in sets of two pieces or factors each and take positions for the selection or the setting of the corresponding parts of the dummy proper (presently to be noted) to select the proper die by the movement of a selecting-finger in two directions, as will later appear. There are of these sets of slides $f$ enough to select a line of maximum number of characters. These slides have notches on their under edges, with which engage the rounded heads of the crank-arms $d^{12}$ of the setting-carriage. These slides $f$ are stepped on their rear ends to form stop-surfaces corresponding in number to the different positions which they are required to take. Normally the slides $f$ all stand to the extreme front of their supporting-frame and by the action of the setting-arms $d^{12}$ of the setting-carriage as variably intercepted by the differentially-notched blade-stops $d^4$ are thrown to the rear the proper distances to locate their stop-surfaces in their proper positions. The slides $f$ have on their left vertical faces alining-lugs $f^3$, projecting outward from the front vertical walls of their notches, for insuring the proper position of the said slides at the forward engaging feed of the setting-carriage. The slides $f$ are spaced apart from each other on their support $f'$ sufficiently far to permit the setting-arms $d^{12}$ of the setting-carriage the necessary clearance or passage-way for their forward stroke in their rocking action.

*The dummy proper at rest.*—$g$ are the stops and $g'$ the carriage constituting the mechanical line or dummy proper, which, after its parts are in position, comes into action to control the matrix-making mechanism. This dummy proper is mounted on a fixed runway $g^2$ and when in its idle or inactive position stands at the extreme right of the same, directly over and in position to be set by the duplicate dummy just previously described. The stops $g$ of this dummy proper work in sets of two pieces or factors in the same way and take different vertical positions, as required to locate the selecting-finger for the alinement of the corresponding die. In other words, the two dummies in the number of their parts and the relative positioning of the same correspond in all respects, but the dummy proper has a traveling movement from right to left, while the duplicate dummy has only a vertical movement in order to transfer its settings to the dummy proper.

The stops $g$ of the dummy have on their front edges ratchet-faced notches, corresponding in number to the different positions which they are required to take. A locking-blade $g^3$ is seated in the dummy's frame under spring-tension to move toward the rear and has a slot-and-pin connection with said frame, as shown at $g^4$. The tension of the spring (not shown) tends to throw the lock-blade $g^3$ toward the rear and hold the same in engagement with the notches of the stops $g$. When moved the other way, a slot-and-pin connection $g^4$ will cam the blade forward out of engagement with the notches. When the dummy is at the extreme right of its runway, in position to be set, as shown in Fig. 4, the said lock-blade $g^3$ will be held back against the tension of its spring by an idle-plunger $g^5$, seated in the right-hand vertical support of the dummy-runway. This plunger is notched, and when the duplicate dummy is raised a projection on the same at the limit of its upward movement strikes the said plunger and lifts the same away from the end of the lock-plate $g^3$, allowing the same to become active to hold the dummy-stops $g$ wherever set on their supporting-carriage or frame $g'$.

Returning again to the duplicate dummy, the vertical parts $f^2$ of its frame are connected by links $f^4$ with arms $f^5$ on an idle-shaft $f^6$, journaled in suitable bearings depending from the bed-plate. One of these arms (the right arm) is provided with a forwardly-extended handle $f^7$, by means of which the operator may raise the duplicate dummy at will.

$f^8$ is a pivoted slide-returning blade mounted on the duplicate-dummy's frame, which is normally held to the rear in the position shown in Fig. 3 by a cord $f^9$, which is under tension from a spring $f^{10}$ on the back of the dummy's runway, (see Fig. 18,) which also has another function to be noted later on. The blade $f^8$ has on its back a cam-lug $f^{11}$. $f^{12}$ is a pivoted cam-block secured to the bed-plate under tension to move toward the front by a spring $f^{13}$. $f^{14}$ is a spring-held latch working through a slot in the cam-block $f^{12}$, with its forward end under the back of the return-blade $f^8$. In their normal position these parts stand as shown in Fig. 3. Their functions will appear in the description of the operation of the primary setting devices.

*The indicator.*—The indicator-blade shaft $e$ is provided with a crank-arm $e'$, (see Figs. 8 and 9,) having pivotally attached thereto a driving-pawl $e^2$, the upper end of which engages with a ratchet-wheel $e^3$, located on the front end of a shaft $e^4$. The shaft $e^4$ is journaled in suitable bearings secured to the dummy-runway $g^2$ and the casing-box $d^{10}$. The shaft $e^4$ carries at its forward end a pointer $e^5$, which moves over a fixed graduated dial $e^6$. The shaft $e^4$ is under tension from a spring $e^7$ to return to its normal or starting position. The ratchet-wheel $e^3$ is held by a retaining-pawl $e^8$. The driving-pawl $e^2$ works against an inclined banking-block $e^9$, so arranged as to prevent the outward disengagement of the said pawl from the tooth of the said ratchet-wheel at the extreme limit of its throw, thereby preventing the racing of the ratchet-wheel, insuring accuracy in the setting of the same. The retaining-pawl $e^8$ is carried by a standard $e^{10}$, rising from one of the cross-bars $f'$ of the duplicate-dummy's frame, and is provided with a releasing-pin $e^{11}$, which on the upward movement of the duplicate-dummy's frame throws out the driving-pawl $e^2$ away from the said ratchet $e^3$. The vertical movement of the retaining-pawl $e^8$ with the standard $e^{10}$ effects its release from the ratchet. These releases occur at the proper time to permit the ratchet-wheel and pointer to be returned to their normal position by the spring $e^7$.

*Word-space rack, &c.*—$h$ is the space bar or key of the keyboard. $h'$ is an arm underlying the said space-key and secured to a pivoted shaft $h^2$, which extends to the right through the box $d^{10}$ and is provided with an outside arm $h^3$, underlying an inwardly-projecting pin $h^4$ of a driving-pawl $h^5$. The arm $h'$ is normally held in its uppermost position by a spring $h^6$, thereby holding up and rendering the pawl $h^5$ inactive. $h^7$ is a word-register rack seated in a groove on the face of the bed-plate and under tension from a spring $h^8$ to move toward the front into its normal position. The pawl $h^5$ is pivoted at its rear end to the link $d^{28}$. Whenever the space-bar $h$ is struck the pawl $h^5$ will be permitted to engage with the word-space rack $h^7$ and under the motion from the link $d^{28}$ will throw the said rack toward the rear one step. The rack will be engaged and held by a retaining-pawl $h^9$.

*The operation of the setting devices.*—First noting that the indicator and the word-space rack or register have connections to the justifier-key, which will be described later on, the operation of the other primary setting devices may now be traced. As the keys are struck at the keyboard the setting-shaft will be released, the setting-blades will be rocked, resulting in the positioning of the parts of the duplicate dummy and the indication on the indicator of the letter-space required by the selected characters, and also in the movement of the word-space rack as many notches toward the rear as there have been word-spaces indicated.

Having regard to the feed movements of the setting-carriage and the setting movements of the blades $d^{11}$ and the crank-arms $d^{12}$, as controlled from the setting-shaft, they are as follows: Normally the crank-arms of the setting-carriage engage the left-hand set of the duplicate-dummy's slides $f$. When the setting-shaft is released, the crank-arms are rocked toward the rear as far as permitted by the blades $d^{11}$ and the raised blade-stops $d^4$. This occurs during the first one-hundred-and-twenty-five-degrees movement of the setting-shaft. The crank-arms are then given a pause or held in that position during the next fifty-degrees movement of the setting-shaft. During this first pause in the rocking motion of the said crank-arms the setting-carriage is fed forward on the blades by the cam-flange $d^{18}$ far enough to disengage the same from the first set of slides $f$. The said arms will then stand in line with the lugs $f^3$ on the slides $f$. During the next one-hundred-degrees movement of the setting-shaft the said crank-arms will be rocked forward into their normal positions and force the next set of slides forward into their normal positions, if necessary. During the next eighty-five-degrees movement of the setting-shaft the crank-arms are held from rocking and are fed forward during this second pause by the cam-wheel $d^{18}$ into engagement with the next set of stops. The cam-wheel $d^{18}$ is so shaped as to give this divided or two-stepped feed movement to the setting-carriage at the proper time. The two pauses or periods of rest in the rocking motions of the blade-shafts $d^{11}$ and crank-arms $d^{12}$ are produced by the peculiar connections from the crank-arm $d^{30}$. The crank-rod $d^{29}$ has its outer end held by the cam-groove $d^{32}$, so that the resultant motion on the link $d^{28}$ will produce the pauses at the times required.

By the successive feed movements of the setting-carriage and the rocking movements of its crank-arm under the action of the setting-shaft when released by the keys and variably intercepted by the blade-stops the slides $f$ of the duplicate dummy will be positioned on their supporting-frame relative to each other as required for the selection of the corresponding dies. The operator can see from the indicator when he must break his line. He then lifts the duplicate dummy by the hand-lever $f^7$, thereby transferring the settings from the duplicate dummy to the stops $g$ of the dummy proper. The duplicate dummy is thus raised and again immediately lowered. Near the limit of the duplicate frame's upward movement the cam-lug $f^{11}$ on the return-blade $f^8$ will clear the cam-block $f^{12}$ and the said cam-block will be thrown forward by its spring $f^{13}$ and be caught by the latch $f^{14}$ and there held until the return of the duplicate-dummy frame. On the down motion of the said frame the cam-lug $f^{11}$ will strike the cam-surface on the cam-block $f^{12}$, and be thereby thrown forward with its free end acting against all the slides $f$ of the duplicate dummy, thereby returning the same into their normal positions on their supporting-frame. As the said frame reaches its lowermost limit the back of the blade $f^8$ will strike the projecting end of the latch $f^{14}$, releasing the same from the cam-block $f^{12}$, and the cam-lug $f^{11}$ will throw the said block backward into its normal position.

On the initial part of the upward movement of the duplicate dummy the retaining-pawl $d^{20}$ was thrown backward by the cam-surface $d^{23}$ and the pin $d^{22}$, (before noted, see Fig. 2,) thereby releasing the setting-carriage and allowing it to be returned by its cord and weight.

On the initial part of the upward movement of the duplicate dummy the driving and retaining pawls for the indicator ratchet-wheel were also released therefrom and the indicator-shaft returned to its normal position by its retracting-spring. During this vertical movement of the duplicate dummy the word-rack $h^7$ was also released from its retaining-pawl $h^9$ and permitted to be returned by its spring $h^8$ into its forward and normal position. All the parts of the primary setting devices now being back to their original or normal positions the operator is free to go forward on the keyboard, selecting the next line. The dummy proper having been set, as before described, by the duplicate dummy, is now ready for its work to control the matrix-making mechanism. Before tracing that action it will be necessary to specify the parts of this matrix-making mechanism.

The Matrix-Making Mechanism.

*The anvil, matrix-holder, &c.*—$k$ is an anvil-block secured between the central supports $a'$ of the main frame at their upper end. On a cylindrical portion of this anvil-block is mounted a revoluble drum or shell $k'$. This shell is movable by hand or in any other suitable way. Seated in the same for transverse movement parallel with its axis are located a series of matrix-material holders $k^2$, which, when at the impression-point, have a slot-and-pin engagement, as shown at $k^3$, with the matrix-material-holder feed-rack $k^4$, which extends outward through a suitable seat in the anvil-block and one of the supports $a'$ and engages at its right-hand end with a pinion $k^5$ on a shaft $k^6$, carrying a ratchet-wheel $k^7$. To the left end of the feed-rack is attached a cord and weight $k^8$, holding the same under strain to return to its normal position.

$k^9$ is the alining-plate, provided with central guide-passage or truing-hole $k^{10}$, through which the dies are impressed into the matrix material $z$, carried by the holder.

$k^{11}$ is the bell-mouthed alining-channel in the anvil-block, which forms a continuation of the holder's path or seat when at the impression-point. The matrix-material holder normally stands in the position shown in Fig. 6 and is fed outward toward the right by variable-feed devices, which will be presently described.

*The dies and die-rods.*—The dies $n$ are cut on the unit principle of self-spacing type. The dies are spring-seated for axial movement in the free ends of radial carriers or die-levers $n'$, which work through radial slots of the truncated dome $n^2$ and through the vertical slots of a guide-casting $n^3$, and are pivoted at their inner lower ends to a plunger-tube casting $n^4$, located at the axial center of the dome, and secured, together with the dome and guide-casting, to a shelf $n^5$, located between and fixed to the central supports $a'$. The dies are thrown to the center of the dome at the common center or impression-point over a reciprocating impression-plunger $n^6$, mounted within the plunger-tube casting $n^4$ as a guide.

The plunger $n^6$ is operated by a toggle-lever $n^7$ on a rock-shaft $n^8$, having a crank-arm $n^9$, connected by rod $n^{10}$ to a cam-lever $n^{11}$, subject to a cam $n^{12}$ on the constantly-running power-shaft $b$, and to a retracting-spring $n^{13}$, applied to the rod $n^{10}$. These connections keep the plunger $n^6$ constantly reciprocating.

Directly below and working through the shelf $n^5$ are a series of die operating or alining rods $n^{14}$, corresponding in number to the number of the dies, the lower ends of which rods are arranged in rows in two directions and held in the lower end or guide-plate $n^{15}$ of a rod box or case $n^{16}$. This grouping of the rods is shown in Figs. 2 and 6, and is for the purpose of permitting any rod or die to be operated upon by the selecting-finger $n^{17}$, and the selecting-finger to be located for this action by movement in two directions, as controlled by the corresponding two factors of the line-dummy. The diagram formed by these rod-terminals or their seats in the guide-plate $n^{15}$ may be conveniently referred to as the "rectangle."

The selecting-finger $n^{17}$ is headed and rests loosely in a finger-block $n^{18}$, which is embraced by the slots of a pair of slides $n^{19}$, which move at right angles to each other, and by this movement locate the said block and finger in any one of ten positions in two different directions, or, in other words, in any one of the various positions required for action on the rods $n^{14}$. The slides $n^{19}$ have rack-bars $n^{20}$ engaging pinions $n^{21}$ on a pair of shafts $n^{22}$, located at right angles to each other, and having pinions $n^{23}$ near their adjacent ends, which engage with racks on a pair of vertically-movable placing-plungers $n^{24}$, the upper ends of which are angularly extended and overhang the path of the line-dummy in position to be intercepted by the dummy-stops. At their lower ends the said plungers are connected by links $n^{25}$ to a pair of spring-arms $n^{26}$, carried by a two-pronged cam-lever $n^{27}$, pivoted to a post $n^{28}$, depending from the bed-plate and subject to the action of a pair of cams $n^{29}$ on the constantly-running power-shaft $b$. These two cams $n^{29}$ give to the said two plungers $n^{24}$ a reciprocating motion, and the spring-arms $n^{26}$ permit the said plungers to be variably intercepted at any point in their downward movement. When the line-dummy is at rest, the said plungers $n^{24}$ are held in their uppermost position by a projecting stop-block $g^6$, rising from the left end of the line-dummy frame. When the placing-plungers are in this position, the spring-arms $n^{26}$ yield under the continued motion imparted to the cam-lever $n^{27}$ by the cams $n^{29}$. When the plungers are in this uppermost or normal and idle position, the selecting-finger block $n^{18}$ will stand in the position shown in Figs. 2 and 6 at the extreme left corner at the back of the rectangle clear of any of the rods $n^{14}$. After the dummy has started into action, as will be presently traced, the plungers will be variably intercepted by the dummy-stops $g$, which have been set for use, which interceptions will result through the connections to the slides $n^{19}$ in positioning the selecting-finger $n^{17}$ for action on the desired rods $n^{14}$.

The slides $n^{19}$ are held and guided by an open-top rectangular box $n^{30}$. Between the sides of this box is located a reciprocating striker-plate $n^{31}$, the stem of which extends downward through the bed-plate and a guide-block $n^{32}$, and is connected by a link $n^{33}$ to a stiff spring-arm $n^{34}$, carried by a cam-lever $n^{35}$. The cam-lever $n^{35}$ is pivoted to a post $n^{36}$, depending from the bed-plate, and is subject to the action of a profile cam $n^{37}$, carried by the constantly-running power-shaft $b$. This cam reciprocates the striker-plate at every turn of the power-shaft $b$. Whenever the selecting-finger is positioned for action on one of the rods $n^{14}$, it will stand with its lower end directly over and in the path of the striker $n^{31}$. Hence the striker will raise the finger, throwing the same against the selected rod $n^{14}$ and alining the corresponding die at the impression-point.

A return-ring $y$ overlies the lower end of the die-levers $n$. This ring is held by pivoted levers $y'$, connected by rods $y^2$ with a yoke $y^3$, fixed on the stem of the striker-plate $n^{31}$. Hence the said ring $y$ will move with the striker-plate, rising with the striker-plate to permit the die-levers to be thrown up, and lowering with the striker-plate, insuring the return of the die-lever by a positive action.

*The matrix-material feed mechanism.*—The rods $n^{14}$, in addition to being arranged into rows in two directions, according to the factors of the line-dummies, are also grouped according to the variable spaces required by their corresponding dies. In other words, the dies requiring a common amount of letter-space in the line are classified or grouped together, so that they can conveniently be made to act on corresponding feed-controlling devices, which in the present case are the stop-levers $k^{12}$. These feed stop-levers are of bell-crank shape and correspond, of course, to the different units of letter-space feed, ranging from two units to seven units, respectively. These levers appear in Figs. 2, 4, and 6. Two of these stop-levers are required for the four units-dies, so that there are seven of these letter-space-feed stop-levers $k^{12}$. A similar bell-crank lever $k^{13}$ is arranged parallel with the levers $k^{12}$ and is used for the word-spacing. This word-spacing lever is of a special construction for affording the variable feed necessary for justification, which special construction will be noted later on. The lower arms of all these bell-crank levers $k^{12}$ and $k^{13}$ overlie knobs or enlargements $k^{14}$ on the respective groups of rods $n^{14}$. A bell-crank trip-bail $k^{15}$ overlies all the said stop-levers $k^{12}$ and $k^{13}$, and the upper arm of the same normally stands under a striker-bar $k^{16}$ of a reciprocating feed-plunger $k^{17}$. This feed-plunger is mounted for vertical movement, and is yieldingly held at its lower end under friction between the prongs of a bifurcated cam-lever $k^{18}$, pivoted on the idle-shaft $f^6$, and subject to the action of a cam $k^{19}$ on the constantly-running power-shaft $b$. At its upper end this feed-plunger carries a spring-held driving-pawl $k^{20}$, which is normally in engagement with the matrix-holder feed-ratchet wheel $k^7$. A retaining-pawl $k^{21}$, pivoted to a projection $k^{21½}$ from the central support $a'$, also engages the said wheel $k^7$ and holds the same wherever set.

Whenever one of the rods $n^{14}$ is raised by the selecting-finger $n^{17}$, one of the levers $k^{12}$ and $k^{13}$ will be raised against its retracting-spring $k^{22}$, thereby lifting the trip-bail $k^{15}$ against its retracting-spring, (not shown,) throwing out its stop-arm from under the striker $k^{16}$ and throwing the stop-arm of the particular raised lever $k^{12}$ or $k^{13}$ into the path of the striker, so as to intercept the feed-plunger $k^{17}$ on its downward movement and thus determine its feed stroke. The stop-arms of these bell-crank stop-levers $k^{12}$ and $k^{13}$ vary in height, so as to vary the stroke of the feed-plunger to give the corresponding desired variable feed on the matrix-material holder.

*The dummy in action.*—Returning now to the line-dummy, it will be recalled that it was left standing at the right of its runway with its stops $g$ set or positioned for use. The dummy-carriage is under strain to move toward the right into its normal position by a cord and weight $g^7$, and is fed to the left against the said strain by a pulling-pawl $g^8$, the free end of which engages with a ratchet-rack $g^9$, cut on the back of the dummy-carriage frame. A retaining-pawl $g^{10}$ holds the carriage wherever set. The pulling-pawl $g^8$ is pivoted to a crank-arm $g^{11}$ on a rock-shaft $g^{12}$, having another crank-arm $g^{13}$ connected by a rod $g^{14}$ to a cam-lever $g^{15}$, pivoted to a post $g^{16}$, depending from the bed-plate. This cam-lever is subject to the action of a cam $g^{17}$ on the constantly-running power-shaft $b$. By this cam $g^{17}$ the pawl $g^8$ is kept constantly moving; but when the line-dummy is in its idle position the free end of said pawl is held up out of contact with the rack $g^9$ by the spring-held trip-pawl $g^{18}$, which is pivoted in the slot of the back wall of the dummy-runway, and is attached at its free end to the cord $f^9$, which cord connects the same with the blade $f^8$, before described, which returns the duplicate-dummy slides $f$ to their normal position. When the duplicate-dummy frame was lowered, the said blade $f^8$ was rocked forward, as hitherto described, and this forward motion of the said blade pulled down the cord $f^9$, drawing out the trip-pawl $g^{18}$ from under the pulling-pawl $g^8$, allowing the latter to become active to feed forward the dummy-carriage. Having been thus started into action, the dummy is fed forward toward the left by a step-by-step motion, bringing its successive sets of stops $g$ in position to successively intercept the placing-plungers $n^{24}$ on their downward motion. By these successive interceptions of the placing-plungers $n^{24}$ the selecting-finger $n^{17}$ is successively located in the different positions required for action on the corresponding die-alining rods $n^{14}$, and under the action of the vertically-movable striker-plate $n^{31}$ the dies are thrown to the impression-point, and the letter-space feed of the matrix-material holder is effected. When at the impression-point, the dies are impressed by the reciprocating plunger $n^6$. In this action of the placing-plungers $n^{24}$ the normal word-space feed is also effected by the said selecting-finger $n^{17}$ and a word-space rod $n^{38}$, acting on the word-space stop-lever $k^{13}$. The said word-space rod is located in the guide-plate $n^{15}$ at the extreme right rear corner of the rectangle. When the line-dummy has been fed through in this way until all of its sets of stops which have been positioned for use in the particular selected line have been called into action, it will be automatically thrown out of action and released. It is thrown out of action as follows: Whenever the plungers $n^{24}$ fall onto the first set of dummy-stops which were not positioned for use in the selected line, both plungers will go down a common distance to their extreme lowermost position. In this position the upper end of a set of raised surfaces $n^{39}$ will engage under the lower end of a broad-faced latch-holder $n^{40}$, (see Figs. 14 and 15,) which is pivoted at its upper end to an idle-plunger $n^{41}$, seated in the back plate of the line-dummy's runway. The latch-holder is held downward and inward under tension by a spring $n^{42}$. On the next upward movement of the plungers $n^{24}$ the latch-holder will be carried upward until it stands clear of a pivoted latch $n^{43}$ under tension from a spring $n^{44}$ and carrying a latch-blade $n^{45}$. As quick as the latch-holder $n^{40}$ is raised to its uppermost position the latch $n^{43}$ will snap its blade $n^{45}$ under the lower ends of the raised surfaces $n^{39}$ and hold the plungers $n^{24}$ in their uppermost position, rendering the matrix-making mechanism inoperative to produce any further impression and holding the plungers up so as to clear the set-stops of the line-dummy on its return movement. When the dummy is in action, the latch-holder $n^{40}$, being in its lowermost position, holds out the latch $n^{43}$, so that its blade $n^{45}$ cannot engage under the raised surfaces $n^{39}$, the raised surfaces $n^{39}$ on the two plungers $n^{24}$ being of such length that one or the other of them will always be engaged by the broad end of the said latch-holder, except when they both are coincidently lowered to their lowermost limit. The two plungers are never thrown to this lowermost limit until they fall onto a set of stops neither of which has been set for use. When the two plungers are thus lowered together to their extreme limit, the selecting-finger $n^{17}$ will be thrown to the right-hand front corner of the rectangle in line with an empty hole in the guide-plate $n^{15}$.

The retaining-pawl $g^{10}$ is located with its free end underlying a projection on the free end of the pulling-pawl $g^8$ and is provided with a backwardly-projecting pin $g^{19}$, working in a slot $g^{20}$ of the idle plunger-block $n^{41}$. Hence when the said plunger-block was forced upward to its limit, as just previously described, the said pin $g^{19}$ would be lifted, thereby carrying upward the free ends of both the pulling-pawl $g^8$ and the retaining-pawl $g^{10}$, thereby releasing the line-dummy carriage and permitting the same to be returned by its cord and weight to the extreme right of its runway into its normal position.

On the upward or releasing movement of the pulling-pawl $g^8$ a cam-surface $g^{21}$ thereon engages and forces backward the latch end or tip of the trip-pawl $g^{18}$, permitting the same to snap under the said pulling-pawl and hold the same up in its inoperative position out of engagement with the dummy feed-rack.

The latch-lever $n^{43}$ is fixed to a rock-shaft $n^{46}$, mounted in bearings to the rear of and parallel with the dummy-runway, and is provided with a backwardly-projecting arm $n^{47}$. This arm $n^{47}$ is connected by a rod $n^{48}$ with the tail end of the matrix feed-ratchet-retaining pawl $k^{21}$. The said retaining-pawl has a pin $n^{49}$ underlying the feed-ratchet-driving pawl $k^{20}$. Hence with this construction when the latch-lever $n^{43}$ was thrown to the front to snap its blade $n^{45}$ under surfaces $n^{39}$ on the plungers $n^{24}$ the arm $n^{47}$ and rod $n^{48}$ will be raised, thereby disengaging the pawls $k^{20}$ and $k^{21}$ from the feed-ratchet wheel $k^7$, thus permitting the matrix-material holder to be returned by its cord and weight $k^8$ to the extreme left into its normal position. The upward movement of this arm $n^{47}$ also effects certain releases of certain of the parts of the justifying mechanism, which will soon be described.

On the return movement of the dummy-carriage $g^3$ a cam-surface (not shown) on its back comes in contact with an idle-pin $n^{50}$, seated in the dummy-runway, and forces the same backward against the latch-holder $n^{40}$. The latch-holder is thereby thrown backward off from the upper end of the raised surface $n^{39}$ of the placing-plungers $n^{24}$ and permitted to be lowered by the spring $n^{42}$. In its downward movement the latch-holder $n^{40}$ engages and throws back the latch-lever $n^{43}$, moving its latch-blade $n^{45}$ out from under the lower ends of the raised surfaces $n^{39}$. The placing-plungers $n^{24}$ will then rest on and be held up in their normal position by the stop-surface $g^6$ at the left end of the dummy-carriage.

With the matrix-making mechanism now described under the control of the dummy proper an unjustified matrix could have been produced in the matrix material $z$. Instead of so doing, however, a justified matrix is produced by the coöperation therewith of justifying mechanism, which will now be described.

The Justifying Mechanism.

*The spacing-controller or justifier proper.*— The principle of this device was very fully set forth in the introductory description. The specific construction of the same as applied to the present machine may be readily understood on reference to Figs. 1, 6, and 11. The two parts of said controller (marked, respectively, $p$ and $p'$) are carried on the word-space stop-lever $k^{13}$, and the part $p'$ is pivoted to the part $p$ for lateral adjustment with respect thereto. The part $p'$ is formed with a flange $p^2$, overlying the upper end of the part $p$, the thickness of which flange represents one unit of feed movement as measured on the feed-plunger $k^{17}$. The part $p$ has a slot-and-screw connection, as shown at $p^3$, with the upper arm of the bell-crank stop-lever $k^{13}$, and also has at its lower end a slot $p^4$, embracing the common pivot-rod $n^{51}$, on which are fulcrumed all the feed stop-levers $k^{12}$ and $k^{13}$ and the trip-bail $k^{15}$. The parts $p$ $p'$ are thus held with freedom for a common vertical adjustment on the lever $k^{13}$, and besides its lowermost may be held in five other positions by a retaining-pawl $p^5$, engageable with any one of six notches $p^6$, cut on the left edge of the part $p$. The said notches $p^6$ are equal in length to one unit of feed movement as measured on the feed-plunger $k^{17}$. These several positions into which the part $p$, together with the part $p'$, carried thereby, may be set will give all the common adjustments or settings of the said parts which may ever be required on the machine as constructed.

On the pivot-stud $p^7$, connecting the part $p'$ with the part $p$, is loosely mounted a ratchet-wheel $p^8$, the hub of which ratchet-wheel is in frictional engagement with the hub of the part $p'$ through a suitable frictional packing (not shown) and is held by a pawl-like retaining-arm $p^9$, projecting from the support $a'$. This ratchet-wheel $p^8$ under the rocking motion of the stop-lever $k^{13}$ against the arm $p^9$ as imparted by the selecting-finger $n^{17}$ and the word-space rod $n^{38}$ will be moved in a continuous direction toward the right. Hence if the part $p'$ be thrown laterally on its pivot into any desired position it will be carried back into its normal position by the movement of the said ratchet-wheel $p^8$ in virtue of its frictional contact therewith and will be prevented from moving beyond its normal position by a pin $p^{10}$, carried thereby, which will strike the left edge of the part $p$. The part $p'$ may therefore be set to the left any number of feed movements away from its normal position and will be carried back thereto one feed movement at a time whenever the said word-space stop-lever $k^{13}$ is rocked. Any desired word-spacing can therefore be secured by the common and the differential (if necessary) adjustment of the parts $p$ $p'$. Suppose, for example, the said parts $p$ $p'$ be as shown in Fig. 11. Then the total word-spacing for the given line, whatever it may be, will be distributed among all the word-spaces six units in a place. If the said parts $p$ $p'$ be raised one notch, the said total word-space, whatever it may be, will be distributed five units in a place, and so on for every notch that the said parts are raised until the last of the said notches $p^6$, which would give one unit or a hair-space to every word-space, or between all the words in the given line. The cases just given illustrate the common adjustment of the parts $p$ $p'$ without considering the differential adjustment of the part $p'$ with respect to the part $p$. Looking at that phase, suppose again that the part $p$ be in the lowermost position, as shown in Fig. 11. Then the plunger $k^{17}$ in its lowering movement to obtain its stroke will be intercepted by the cross-bar $k^{16}$ thereof coming in contact with the top flange $p^2$ of the part $p'$; but if the part $p'$ be thrown toward the left then $k^{17}$ could lower one unit of feed movement farther, until the bar $k^{16}$ was intercepted by the top of the part $p$. This differential adjustment is used to throw in the integral remainder one unit in a place, beginning with the first word-space in the line.

Suppose, for example, that in a given case there be twenty-seven units of word-space to distribute or provide for in order to make the line justify and that there are five words or four word-spaces in the line. Then twenty-seven divided by four equals quotient six, with remainder three. Then the part $p$ will be left in its lowermost position and the part $p'$ be thrown toward the left three steps of feed movement, or three notches of the ratchet-wheel $p^8$, and hence during the first three feed movements of the plunger $k^{17}$ the bar $k^{16}$ will lower until intercepted by the top of the part $p$, at which time the part $p'$ will have been returned to its normal position, and during the remaining movement of the plunger $k^{17}$ the bar $k^{16}$ will be intercepted by the top flange $p^2$ of the part $p'$. Hence the said total of twenty-seven units will be distributed seven units to each of the first three word-spaces and six to the last word-space. In other words, the integral quotient is divided equally among all the word-spaces and the integral remainder one unit in a place, beginning with the first word-space, until the entire remainder is distributed.

Suppose again that there be a total of seventeen units to distribute and five word-spaces in the given line. The quotient would be three and the remainder two. Then the part $p$, together with the part $p'$, would be thrown up three notches farther than shown in Fig. 11 or until the pawl $p^5$ engages with the fourth of the notches $p^6$, counting downward, and the part $p'$ will be thrown toward the left two steps or teeth of the ratchet $p^8$. The resulting division will be four units among the first two word-spaces and three among the remaining three word-spaces, or otherwise stated 4, 4, 3, 3, 3.

Suppose again that the total of word-spacing for a given line be eight units and there be seven words or six word-spaces. Then the quotient will be one with a remainder of two. In this event the part $p$, together with the part $p'$, will be raised to its highest point or until the pawl $p^5$ engages with the lowest of the notches $p^6$, and the part $p'$ will be thrown to the left two steps or teeth as measured on the ratchet-wheel $p^8$. The resulting division will be two units to each of the first two word-spaces and one unit or hair-spacing of the remaining four word-spaces. Otherwise stated the spacing will be 2, 2, 1, 1, 1, 1.

From the foregoing descriptive statements and illustrations it is obvious that the said parts $p$ $p'$ make up a spacing-controller or justifier proper which will meet every possible case and distribute or provide for the taking up of any possible amount of word-space which may be required to justify the line, working out this result by way of quotient and remainder.

The said spacing-controller or justifier proper might, as has already been said, be set by hand. Instead of so doing, however, it is set by the justifier-key, as already intimated, and to permit this result the part $p$ of the spacing-controller is provided with a downwardly-projecting finger $p^{11}$, and a similar finger $p^{12}$ is provided for acting on the part $p'$. This finger $p^{12}$ is carried by the lower arm of a bell-crank lever $p^{13}$, the upper arm of which is connected by a link $p^{14}$ with said pivoted part $p'$.

*The justifier-key.*—The principle of this device has also been fully set forth in the introductory description. Referring to Figs. 1, 6, 11, and 8, 9, and 10 its specific construction and action may be readily traced. The individual parts thereof, which work in sets of two pieces each, are in the form of radial pins $t$ $t'$, which are secured to a common cylindrical support $t^2$. This cylinder or drum $t^2$ is mounted for rotary movement with and sliding movement on a rectangular shaft $t^3$, which shaft is journaled in a vertically-movable frame $t^4$. The said sets of pins $t$ $t'$ are mounted on said support $t^2$ in a bifactored arrangement, so as to form axial rows lengthwise of said support and circular rows around the same. The band $t^5$ serves to indicate the circles of sets to the eye, but has no other function.

If we suppose the machine to have been designed for a possible distribution of twenty-seven units of word-space among lines having eleven words or ten word-spaces or a less number, then the said justifier-key could be constructed, as shown in the drawings, with one hundred and ninety-two sets of the radial pins $t$ $t'$, arranged on the support $t^2$ in eight circles of twenty-four sets each or twenty-four rows parallel with the axis of the support $t^2$ and eight circular rows around the said support $t^2$. It will be well, for the sake of distinctness and ease in following the further description and illustrations, to conceive these rows as numbered from "27" down to "4," the other three imagined rows being omitted. The twenty-seventh row may then be considered as providing for the maximum distribution of twenty-seven units, the twenty-sixth row for twenty-six units, and so on down to the fourth row, which might distribute four units. It is only necessary, therefore, to revolve the support $t^2$ to bring into position for action any desired or needed axial row of said sets of pins $t$ $t'$, according to the quantity or total amount of word-space measured in units. Then any particular set of that row which may be brought into action through $p^{11}$ and $p^{12}$ on the parts $p$ $p'$ will set the same for the distribution of that amount of word-space. The other or sliding movement of the support $t^2$ is to position the proper circle of any axial row according to the number of word-spaces in the particular line. For instance, if there be twenty-seven units to distribute and nine words, or eight word-spaces, the twenty-seventh axial row and the eighth circular row, numbering from the rear of said support $t^2$ and treating the first shown row as row No. 3, would be brought into position for action on the said parts $p$ $p'$ of the justifier proper. If there had been twenty-seven units to distribute and only three word-spaces, the row No. 3 or rearmost circle of the said twenty-seventh axial row would be brought into position for action on the said parts $p$ $p'$, and so on for any intermediate quantity and any intermediate number of word-spaces, the rotary movement of said support $t^2$ giving the proper axial line and the sliding movement thereof the proper circle to locate the proper set of pins $t$ $t'$. These movements of the said support $t^2$ might of course be effected by hand. Instead of so doing, however, they are, as hitherto intimated, effected from the letter-space and word-space connections of the keyboard. These connections will now be traced. Taking first the rotary movement, the same is effected through the letter-space indicator $e^5$ $e^6$. The indicator-shaft (see Fig. 9) carries at its rear end a driving-pawl $t^6$, engageable at the proper time with a stud $t^7$ on a loose pulley $t^8$, which is connected to one end of a band $t^9$, the other end of which band is connected to a relatively small pulley $t^{10}$ on the front end of the rectangular shaft $t^3$, which carries the support $t^2$ of the justifier-key. The rectangular shaft $t^3$ is turned through the cams above noted against the tension of a retracting-spring $t^{11}$ and is held by the retaining-pawl $e^8$ of the indicator feed-ratchet wheel $e^3$.

Suppose now that the predetermined line for which the machine is built contains, as hitherto intimated, one hundred and thirty units, and suppose in a given line, as indicated on the keyboard, there be one hundred and three units of letter-space required for the indicated letters and characters, leaving twenty-seven units of word-space to be divided in order to make the line justify. Then the driving arm or pawl $t^6$ on the indicator-shaft $e^4$ will just have reached the stud $t^7$ on the pulley $t^8$, but will not have turned the said pulley or imparted any motion through the band $t^9$ to the justifier-support $t^2$. Hence the twenty-seventh axial row of said support $t^2$, or the row provided for the maximum quantity of word-space, will be left standing in position for action through the parts $p^{11}$ and $p^{12}$ on the parts $p\,p'$ of the justifier proper. If instead of twenty-seven the line had been twenty-six units short, the said support $t^2$ would be turned one step from the right toward the left, bringing the twenty-sixth axial row in position; and so on, if the line was twenty-five units short, the support $t^2$ would be rotated two steps; if twenty units short the support $t^2$ would be rotated seven steps, bringing the twentieth axial row into position, and so on down to the fourth or last row shown on the said support $t^2$, which said fourth row would provide for four units of word-spacing.

From the foregoing it will be seen that the letter-space members of the keyboard, working through the indicator, set the justifier-key for the total quantity of word-spacing in any given line.

The sliding movement of the justifier-key is effected by the word-space members or connections from the keyboard. Normally the justifier-key, in respect to its sliding movement, stands as shown in Fig. 1, where it is held by a cord and weight $t^{14}$, applied to a rack $t^{15}$, which rack is seated in the bed-plate $a$ and has an arm $t^{16}$ connecting the same with the support $t^2$ of the justifier-key. The said rack $t^{15}$, together with the justifier-key, is moved toward the rear by the word-rack $h^7$ through the operation of the word-space key $h$, which parts have been hitherto described. The word-space rack $h^7$ is moved against the tension of the retracting-spring $h^8$ and is held by the retaining-pawl $h^9$, engaging teeth cut on the rear end of the rack.

In order that the rear circle of the sets of pins $t\,t'$ of the justifier-key may be used for lines having four words or three word-spaces, the said space-rack $h^7$ stands two steps forward of the front end of the rack $t^{15}$. Hence the said rack $t^{15}$ and the justifier-key will not be moved until the third word-space is struck on the space-bar $h$ of the keyboard. When said third word-space is struck on the said space-bar $h$ of the keyboard, the said rack $h^7$ will move the rack $t^{15}$ and the justifier-key toward the rear one notch, where it will be held by the retaining-pawl $h^9$. Thereafter the justifier-key will be moved toward the rear one step every time that a word-space is struck on the spacing-bar $h$ of the keyboard. In this way the justifier-key will be positioned to locate the proper circle of the said sets of pins $t\,t'$, the rearmost circle for lines having three word-spaces, the next circle for lines having four word-spaces, and so on to the front circle, which would be positioned under the fingers $p^{11}$ and $p^{12}$ in lines having ten word-spaces.

In the ways now described the said justifier-key is properly positioned to bring the proper set of its pins $t\,t'$ into action on the fingers $p^{11}$ and $p^{12}$, and through the same to set the parts $p\,p'$ of the justifier proper so as to control the spacing in any given case to justify the line. This setting of the justifier, however, does not occur until the said justifier-key is raised by moving upward its supporting-frame $t^4$. When the said frame $t^4$ is raised, as will presently appear, a locking-strip $t^{12}$ at the initial movement thereof engages with a notched block-disk $t^{13}$ on the left end of the rectangular shaft $t^3$, carrying the justifier support or drum $t^2$, thereby holding the same in its set position against the spring $t^{11}$ after the indicator is released and permitted to return to normal position.

Turning to the means by which the justifier-key is raised, the frame $t^4$, carrying the shaft $t^3$, is mounted in fixed vertical guides $t^{17}$. The front end of the said frame $t^4$ extends downward through a slot in the bed-plate in position to be engaged by the upper end of a screw-threaded bolt $t^{18}$, adjustably seated in one of the arms $f^5$, by which the duplicate-dummy frame is lifted, as hitherto described. The front and rear members of the frame $t^4$ have rack-teeth engaging, respectively, with pinions $t^{19}$ and $t^{21}$ on a shaft $t^{20}$, which arrangement insures true parallel vertical movement of both ends of said frame. When the operator at the keyboard lifts the duplicate dummy by raising the hand-lever $f^7$ and the arm $f^5$, he thereby also raises the frame $t^4$ and the justifier-key, and this vertical movement of the justifier-key will cause the properly-located set of pins $t\,t'$ of the said key to raise the fingers $p^{11}$ and $p^{12}$, and through the same to set the parts $p\,p'$ constituting the justifier proper in the required positions for controlling the word-spacing so as to justify the line. The instant that the frame $t^4$ began to rise a retaining-pawl $t^{22}$ was permitted to snap into the rack $t^{15}$, thereby holding justifier-key in its proper set position on the shaft $t^3$. As soon as the pawl $t^{22}$ snaps into the rack $t^{15}$ the retaining-pawl $h^9$ is lifted by a link $t^{23}$ on the frame $t^4$ away from the word-space rack $h^7$, thereby permitting the said rack $h^7$ to be thrown forward by its retracting-spring $h^8$ into its normal position. The justifier-key is of course first raised and then again immediately lowered, the same as the duplicate dummy. On the return movement of the frame $t^4$ a part of the same strikes the tail of the retaining-pawl $t^{22}$ and throws the same up into its inactive position, thereby releasing the rack $t^{15}$ and permitting the same to be thrown forward by its weight and cord $t^{14}$ into its normal position against a fixed stop. (Not shown.) The retracting-spring $t^{11}$ at this time rotates the justifier-key backward into its normal position.

It will be recalled that the parts $p\,p'$ of the justifier proper are held in their common adjustment by the retaining-pawl $p^5$ and that the part $p'$, if differentially adjusted or set laterally in respect to the part $p$, is held by friction.

At the time when the dummy proper is thrown out of action and the matrix of the given line for which the said dummy had been set has been made the shaft $n^{46}$ is rocked, as before stated, lifting the arm $n^{47}$ and through a rod $p^{15}$ rocking the pawl $p^5$ upward, thereby releasing the parts $p\,p'$ of the justifier proper, allowing the same to lower by gravity into their normal position.

The parts of the justifier proper and of the justifier-key for setting the same have now been specified in detail and the actions of the same so fully stated and illustrated that it is thought that the same can be readily understood. Respecting the justifier-key, it should, however, perhaps be noted that it might be constructed to provide for any desired quantity of word-space by simply increasing or decreasing the number of the axial rows of said sets of pins $t\,t'$ and correspondingly arranging the letter-space indicator to begin the rotary movement of the support $t^2$ earlier or later. So, likewise, the distribution or division might be made among a greater or less number of words by simply increasing the number of the circular rows of said pins $t\,t'$.

In practice the justifier-key shown and described will answer for distributing any desired quantity of word-space from twenty-seven units down and among any number of words from eleven down to four. Otherwise stated, a line having only three words or two word-spaces is not provided for on the justifier-key.

At the time of constructing the machine the pins $t\,t'$ of the justifier-key must be adjusted to the actual and exact heights required for the proper settings of the parts $p\,p'$ of the justifier proper.

*The Operation of the Machine as an Entirety.*

The operation of the particular groups of mechanism have been so fully stated in connection with the description of the parts that anything more than a brief summary at this point is deemed unnecessary.

The operator at the keyboard selects the characters exactly as on an ordinary typewriter. This results, through the primary setting devices, in positioning the slides $f$ of the duplicate dummy in their proper relative position on the supporting-frame and in positioning the justifier-key as required for justification. The operator then takes hold of the lever-handle $f^7$ and lifts both the duplicate dummy and the justifier-key. This transfers the settings of the duplicate dummy to the dummy proper and causes the justifier-key to set the justifier proper as required for justification. On the return movement of the duplicate dummy and the justifier-key all the releases necessary are effected and all other movements given which are essential to restore the primary setting devices into their normal positions, and the dummy proper is also tripped into action. The operator then goes forward at the keyboard, selecting the next line, and the dummy proper is fed forward toward the left, controlling the matrix mechanism to produce a justified matrix of the first line. When all of the parts of the dummy which were set for use in the selected line have been brought into action, the matrix-making mechanism is automatically rendered inoperative to produce any further impressions, the dummy is released and permitted to return to its normal position, and all other releases are effected necessary to permit the matrix-material holder and the parts of the variable-feed mechanism to return to their normal positions. By this time the operator at the keyboard should have completed or nearly completed the selection of the next line and be ready or about ready to again lift the duplicate dummy and the justifier-key to transfer the settings of the same.

Although the action of the dummy in its control of the matrix-making mechanism was stated in connection with the description of the parts, it may help to render the same more distinct by noting the relative timing of the matrix-making mechanism. These are as follows: The finger-placing plungers $n^{24}$ are lowered to locate the selecting-finger $n^{17}$ by the cam-lever $n^{27}$ and one of the cams $n^{29}$ during the first fifty-degrees movement of the power-shaft after the dummy has been started into action. The striker-plate $n^{31}$ is then raised by the cam-lever $n^{35}$ and the profile-cam $n^{37}$ during the next eighty-degrees movement of the power-shaft, (fifty to one hundred and thirty degrees,) thereby alining the selected die and holding the same at the impression-point. During the next sixty degrees of movement the impression-plunger $n^6$ is thrown up by the cam-lever $n^{11}$ and the cam $n^{12}$, producing the impression, (one hundred and thirty to one hundred and ninety degrees.) During the next seventy-five-degrees movement the striker-plate is thrown down into its normal position, (one hundred and ninety to two hundred and sixty-five degrees.) During the next forty degrees the finger-placing plungers $n^{24}$ are raised upward to their limit, (two hundred and sixty-five to three hundred and five degrees.) During the next forty-five degrees the dummy is fed forward toward the left by the pulling-pawl $g^8$, the cam-lever $g^{15}$, and the cam $g^{17}$, thereby bringing another set of dummy-stops $g$ under the finger-placing plungers $n^{24}$. There is then an idle interval of about ten degrees, (three hundred and fifty to three hundred and sixty degrees.) The toggle $n^7$, operating the impression-plunger $n^6$, was carried past the center in making the impression and remained in that position until the striker-plate $n^{31}$ started to lower and the return-ring $y$ carried the die-levers away from the impression-point. The impression-plunger was then returned to its normal position at any time during the remainder of the movement of the power-shaft. These movements occur over and over again at the selection of every die. They also occur at the word-space movement; but the selecting-finger then acts only on the word-space rod $n^{38}$, and the movement of the impression-plunger does no harm, as there is no die at the impression-point. The striker $n^{31}$ and the plunger $n^6$ also continuously reciprocate when the dummy proper is at the right of its runway in its idle position; but the selecting-finger is then in such a position that it is inactive on any of the rods in the rectangle.

I claim—

1. A spacing-controller or justifier proper, comprising a pair of parts, such as $p\ p'$, capable of a common adjustment, according to integral quotient, and a differential adjustment according to integral remainder of the total word-space, expressed in units, divided by the number of word-spaces in the line, and a returning device for restoring the differentially-adjusted part to its normal position after the integral remainder has been thrown in, substantially as described.

2. The spacing-controller or justifier proper, comprising the part $p$ carrying the pivoted part $p'$ with flange $p^2$ normally overlying the top of the part $p$ and adjustable away from the same, of the ratchet $p^8$ for returning said part $p'$ to its normal position one step at a time, as the word-space movements occur, and a detent as $p^5$, operating to hold said parts $p\ p'$ in their common adjustment, the said parts coöperating to distribute the total word-space of any line, according to quotient and remainder, substantially as described.

3. In a matrix-making or similar machine, the combination with variable-feed mechanism for the impression material, of a spacing-controller or justifier proper comprising a pair of parts having a common adjustment according to integral quotient and differential adjustment according to integral remainder of the total word-space and adapted to be set to control said feed mechanism, so as to distribute the total word-space for any line according to quotient and remainder, substantially as described.

4. In a matrix-making or similar machine, the combination with a variable-feed mechanism, for the impression material, tending to give, at each action, the maximum feed, of a spacing-controller or justifier proper, comprising a pair of coöperating parts $p\ p'$ having a common adjustment according to integral quotient and a differential adjustment according to integral remainder, adapted to be set to intercept and limit said feed mechanism, as required to distribute the total word-space, according to the integral quotient and remainder resulting from the division of said total word-space, expressed in units, by the number of word-spaces in the given line, substantially as described.

5. The combination with the feed-plunger $k^{17}$, of the spacing-lever $k^{13}$, the part $p$ adjustable on the stop-arm of the lever $k^{13}$, the part $p'$ carried by and pivotally connected to the part $p$ and having the flange $p^2$ and the pin $p^{10}$, a retaining device as $p^5$ for holding the part $p$ wherever set, means, such as the lever $p^{13}$ and link $p^{14}$ for setting the part $p'$ with respect to the part $p$, the ratchet-wheel $p^7$ in frictional engagement with the part $p'$ and the fixed pawl $p^9$, for returning the part $p'$ to normal position in respect to the part $p$, under the motion of the lever $k^{13}$, substantially as and for the purpose set forth.

6. In a matrix-making or similar machine, the combination with a variable-feed mechanism, for the impression material, of a justifier-key consisting of a series of parts or particular keys on a common support in a bifactored arrangement and predetermined for every possible variation in the word-space feed required for the justification of any possible line, the proper part or particular key of which is available to set the word-space feed as required for the justification of any selected line.

7. In a matrix-making or similar machine, the combination with a variable-feed mechanism for the impression material, of a justifier-key, consisting of parts or particular keys on a common support in a bifactored arrangement and predetermined for every possible variation in the word-space feed required for justification, said justifier-key being adapted to be positioned in advance of the feed to bring into action such of said parts as may be necessary to set the said feed mechanism to justify the line.

8. In a matrix-making or similar machine, the combination with a variable-feed mechanism having as one of its elements a spacing-controller or justifier proper, consisting of a pair of parts, one or both of which are adapted to be set to fix the uniform variation of the feed among all the words and the other of which is adapted to make the variation for odd units of a justifier-key consisting of a series of parts or particular keys working in sets of two, or pairs, corresponding one to each of the two parts of the word-space stop device, sufficient in number and predetermined for every possible setting of said stop device required for the justification of any line and arranged on a bifactored principle to permit the proper part to be alined, by a duplex movement, for action on said stop device.

9. The combination with the variable-feed mechanism having the parts $p\ p'$ of the justifier-key consisting of a common support capable of movement in two directions and a series of sets of parts, for action on the parts $p\ p'$, sufficient in number of sets and predetermined for every possible setting required for justification and arranged on said support to form rows in bifactored arrangement, whereby the movements of the support may be made to aline the proper set of parts of the key for action on the parts $p\ p'$ of the stop device to set the same as required.

10. The combination with the letter-space indicator and the word-space rack controlled from the keyboard, of the shaft $t^3$ revoluble by the indicator, the justifier-key mounted to revolve with and slide on said shaft, and the rack $t^{15}$ connected to the justifier-key and subject to the action of the word-space rack for sliding the key on the shaft, substantially as and for the purpose set forth.

11. The combination with a font of individually-movable dies, of an impression-material holder, a series of die-alining rods having their terminals grouped according to the space required by the dies, a yieldingly-held feed-plunger and a series of stop-levers corresponding to the different groups of feed movements operated from said rods for variably intercepting said feed-plunger, substantially as described.

12. The combination with the font of variably-spaced dies separately carried on individually-movable die-levers, of corresponding die-alining rods having their terminals at one end factored into rows in two directions and also grouped according to the space required for the dies, the dummy with prearranged stops, the selecting-finger, placing mechanism controllable by said dummy to locate said finger for action on said rods, a separate word-space rod parallel with the die-rods, a yieldingly-held feed-plunger and a series of letter-space stop-levers operated by said groups of rods; a word-space stop-lever operated by said word-space rod, to variably intercept said plunger and a bail-trip under said plunger operated by all of said spacing-levers, substantially as and for the purpose set forth.

13. The combination with the selecting-finger, of the dummy proper, the finger-placing devices, and means for rendering said dummy inoperative on said finger whenever its prearranged stops have done their work, consisting of a trip operated by the coincident extreme movement of said placing devices as permitted on reaching the first unset dummy-stops.

14. The combination with the selecting-finger $n^{17}$, of the slotted slides $n^{19}$ embracing said finger mounted in ways and movable in different directions to locate said finger, the placing-plungers $n^{24}$ and the rack-and-pinion connections with said slides for positively locating said finger, substantially as described.

15. The combination with the setting-carriage having the crank-arm $d^{12}$ of the duplicate-dummy slides $f$ having the return alining-lugs $f^3$, substantially as and for the purpose set forth.

16. The combination with the setting-carriage of the rock-shaft blades on which the said carriage moves and by which its crank-arms are rocked, of the friction-clutches yieldingly holding said rock-shafts, the setting-shaft $c$, with crank $d^{30}$, the curved fixed camway $d^{32}$, the rod $d^{29}$ operated by the crank and having its outer end held to work in said curved camway, and the link $d^{28}$ connecting $d^{29}$ to the rigid members of the friction-clutches, for producing rests or pauses in the rocking motion of said rock-shaft blades, substantially as and for the purpose set forth.

17. The combination with the finger-placing plungers $n^{24}$ having the raised surfaces $n^{39}$, of the latch-holder $n^{40}$, the idle-plunger $n^{41}$, the spring-held latch-lever $n^{43}$ having the latch-blade $n^{45}$, the said parts operating substantially as and for the purpose set forth.

18. The combination with the return-blade $f^8$, having the cam-lug $f^{11}$ of the cam-block $f^{12}$, the latch $f^{14}$ working through a slot in block $f^{12}$ and the spring $f^{13}$, operating substantially as and for the purpose set forth.

19. The combination with the blade $f^8$ of the trip-pawl $g^{18}$, the connecting-cord $f^9$ and the dummy feed-pawl $g^{18}$, substantially as and for the purpose set forth.

20. The combination with the setting-carriage of the rock-shaft-setting blades on which the carriage slides and by which its crank-arms are rocked, having two periods of rest or two pauses in their rocking motion, to permit a two-stopped feed movement of the setting-carriage.

21. The combination with the setting-carriage of the rock-shaft-setting blades, on which the carriage slides and by which its setting-arms are rocked, of the setting-shaft having a crank, a connecting-rod from the same having its outer end held to move in a curved camway, and a connection from said rod to rocking connections on said shaft, whereby the said shafts will be rocked with two intervals of rest or with two pauses.

22. The combination with the spacing-controller or justifier proper, consisting of the pair of parts $p\ p'$, having a common and a differential adjustment, and coöperating as described, to distribute the total word-space, according to the integral quotient and remainder of the said total space, expressed in units, divided by the number of word-spaces in the given line, of the justifier-key consisting of the support $t^2$, movable in two directions, and having the sets of pins $t\,t'$, arranged thereon in rows in two directions, predetermined for every possible setting of said justifier proper that may ever be required, and positionable for action on said justifier proper by the said two movements of said support, substantially as described.

23. The combination with the bank of keys, of the letter-space indicator operated thereby, the word-space rack operated by the word-space bar of the keyboard, the justifier-key comprising the support $t^2$, revoluble by said indicator and slidable by said word-space rack, containing the sets of pins $t\,t'$, arranged in axial rows, according to quantity of word-space, and in circular rows, according to number of word-spaces, and the spacing-controller or justifier proper, consisting of the parts $p\,p'$, capable of a common and differential adjustment, adapted to be set by said justifier-key, to control the spacing, according to quotient and remainder, as described, to justify any line.

In testimony whereof I affix my signature in presence of two witnesses.

FRANK AMOS JOHNSON.

Witnesses:
JAS. F. WILLIAMSON,
A. H. OPSAHL.